Sept. 29, 1970 G. C. ROSIN ET AL 3,531,705

METHOD AND APPARATUS FOR AUTOMATIC LOAD TRANSFER

Filed Nov. 5, 1965 9 Sheets-Sheet 1

INVENTORS
GEORGE C. ROSIN
RALPH W. SPAFFORD
BY
Watts & Fisher
ATTORNEYS

METHOD AND APPARATUS FOR AUTOMATIC LOAD TRANSFER

Filed Nov. 5, 1965

9 Sheets-Sheet 2

INVENTORS
GEORGE C. ROSIN
RALPH W. SPAFFORD

BY Watts & Fisher

ATTORNEYS

INVENTORS
GEORGE C. ROSIN
RALPH W. SPAFFORD
BY
Watts & Fisher
ATTORNEYS

INVENTORS
GEORGE C. ROSIN
RALPH W. SPAFFORD
BY Watts & Fisher
ATTORNEYS

METHOD AND APPARATUS FOR AUTOMATIC LOAD TRANSFER

Filed Nov. 5, 1965

INVENTOR.
GEORGE C. ROSIN
RALPH W. SPAFFORD

BY Watts & Fisher

ATTORNEYS

AUTOMATIC CYCLE SEQUENCE CONTROL CIRCUIT 150

INVENTORS
GEORGE C. ROSIN
RALPH W. SPAFFORD
BY
Watts & Fisher
ATTORNEYS

METHOD AND APPARATUS FOR AUTOMATIC LOAD TRANSFER

Filed Nov. 5, 1965

9 Sheets-Sheet 7

INVENTOR.
GEORGE C. ROSIN
RALPH W. SPAFFORD

BY

Watts & Fisher

ATTORNEYS

VERTICAL TRAVEL DIRECTION AND ELEVATION SELECTION CONTROL

INVENTORS
GEORGE C. ROSIN
RALPH W. SPAFFORD

BY Watts & Fisher

ATTORNEYS

PROXIMITY HOMING CONTROL

INVENTORS
GEORGE C. ROSIN
RALPH W. SPAFFORD
BY
Watts & Fisher
ATTORNEYS

United States Patent Office 3,531,705
Patented Sept. 29, 1970

3,531,705

METHOD AND APPARATUS FOR AUTOMATIC LOAD TRANSFER

George C. Rosin, South Euclid, and Ralph W. Spafford, Willowick, Ohio, assignors to Eaton Yale & Towne, Inc., a corporation of Ohio Filed Nov. 5, 1965, Ser. No. 506,568
Int. Cl. G05b *19/14, 19/28*
U.S. Cl. 318—567 9 Claims

ABSTRACT OF THE DISCLOSURE

A load transfer system includes apparatus for positioning a load carrier adjacent a particular load support station by detecting the particular station, decelerating the load carrier by motor control and reversing the direction of load carrier travel at reduced speed until the load carrier again detects the particular load support station whereat the load carrier is braked to a rapid stop.

The present invention relates to load transfer mechanisms and relates more specifically to methods and apparatuses for automatically transferring loads among a plurality of load supports.

The present invention is particularly concerned with automatic reversible stacker cranes or carriers which travel on fixed runways and operate shuttle forks to transfer loads among a plurality of load receiving and storing supports. These supports are generally arranged side-by-side along the runway and are also stacked, thereby providing a cellularly arranged cubical storage system. Each cubicle has an address determined by its station number along the runway and its elevation or tier number in each stack.

In automatic stacker crane systems, the stacker cranes automatically pick up and deliver loads between storage cubicles and between storage cubicles and one or more HOME stations, the latter being main pick up and delivery points and are often feeder conveyors. A delivery from one HOME cubicle to a storage cubicle, a delivery from one cubicle to another or a retrieval of a load from a cubicle to a HOME point are defined herein as command functions. It is preferred that the automatic stacker crane system be capable of performing one or more command functions which are programmed on a control console either carried by the stacker crane located remote from it. The cubicle address involved in each command function is programmed on the console.

When the control console is remotely located relative to the movable stacker crane, the stacking intelligence is conveyed to the stacker crane either by an unbilical cord, by remote control bus bars, or by an "interface" system. In the prior automatic stacker systems, the large number of wires needed to convey the stacking intelligence to the crane necessarily prohibited the use of the conventional bus bar and sliding contactor arrangements. Thus, prior to the present invention, almost all completely automatic stacker control systems utilizing a remote control console used either an umbilical cord or an interface system. The interface system involved a control box which is carried by the stacker crane and has a surface which mates with a box on the control console when the crane returns to its HOME station. The stacking intelligence programmed in the control console is transferred to the control box on the stacker crane. The stacker crane then carries out the operation specified by the transferred intelligence.

The prior systems are limited as to the number of cubicles which can be serviced and the number of command functions which can be performed during one complete automatic sequence of operation. The prior systems are limited by reason of practical limitations of size as an increase in the number of cubicles also requires at least a proportional increase in the number of relays and other electrical devices required to be carried by the stacker crane. The prior systems are also limited by the expense of assembly and of maintaining the complicated systems.

In prior stacker crane control systems, a major part of the electrical circuits provided are required for identifying the address of each cubicle as the stacker crane moves along the runway. Some prior systems utilize a counting system wherein a relay is carried by the crane and is engaged and operated by a cam at each station. As the crane proceeds along the runway, the relay is operated each time it passes a cubical station to provide a pulse for that station. The impulses are fed to a suitable counter which determines the location of the stacker by counting from a place of beginning which is usually the HOME station. The problem with these counting systems is that if a count is missed or if a false count pulse is introduced to the counter, then the stacker will make a wrong identification of its station location. For example, transients involved in power failures provide pulses which may be counted. Also, erroneous pulse counting can occur due to current surges as from a collector jumping on the conductors.

Moreover, the counting systems do not facilitate minimum crane travel between selected stations. For example, after a crane has made a delivery or a pick up and is to go to a place of a second command, it must decide whether to go up or down the aisle to reach the cubicle station dictated by the second command. A counting type of system is not able to tell in which direction it must travel to go immediately to the next station. It is necessary for the crane to go back to the place of beginning, i.e., the HOME station, and from this location determine the direction to the place dictated by the second command.

In still other prior systems, a plurality of relays are carried by the stacker crane and are engaged by cam actuators at each station location. The arrangement of the indicators at each station differs and can be identified by the number of relays actuated at each station. In these systems, a total number of stations which can be serviced by a given number of relays is generally the square of the number of relays. The control circuit for identifying which of the relays are actuated at each station in order to determine the station number is quite complex and requires a great deal of cross wiring between the relays. In addition, these systems also determine the location of the station of each command function by reference to a place of beginning. In these identification systems, as in the counting systems, a great deal of needless crane travel occurs since the crane has to travel back to the place of beginning, i.e., the HOME station, before going to the station of the next command function.

In the present automated stacker crane system, binary comparison systems are utilized to identify the address location of each cubicle and also determine the direction the stacker must travel to go directly from one cubicle to another without having to travel to a fixed base or home station first. Each cubicle is identified as to its station number by a plurality of indicators which are arranged in a binary pattern. The binary pattern of the indicators is read by a cubicle address reading control circuit carried by the stacker crane and is compared to the binary pattern of cubical address selection devices on the control console. When the crane arrives at a cubicle station whose indicators are arranged in a binary pattern indicating an address which agrees with the binary pattern of the address programmed on the control console, the stacker is stopped. The cubicle is identified as to its tier or elevation address by a similar binary comparison of the binary pattern of the programmed tier address to the binary pattern of tier address indicators at each tier as are read by tier address reading control devices carried by a shuttle fork carriage as it is raised or lowered.

With the present binary cubical address identification system, the number of stations which can be serviced by a given number of indicating devices is represented by the equation $S=2^N-1$ wherein S is the number of stations and N is the number of indicators provided. Thus, five indicators can be arranged in the present system to identify 31 cubical stations. Where limit switches are used as the binary pattern reading devices, only five limit switches are required. Adding two more indicators and indicator reading devices increases the total possible stations to 127. Thus, each additional indicator and indicating reading device increases the total number of stations in a geometric series.

In the present stacker control system, the direction the stacker must travel to perform each command function is determined by comparing the binary pattern of the present location of the stacker crane to the binary pattern programmed on the address selection devices for the next command function to be performed. If the station number as represented by the binary pattern of the indicators at the stacker's present cubical location is lower than the station number represented by the binary pattern of the address selection devices, then the stacker crane is instructed to travel in one direction, e.g., down the aisle to reach the selected cubicle. If the station number of the stackers' present location is higher than the station number of the next command function, then the stacker is instructed to travel in another direction, e.g., up the aisle. This determination of direction of horizontal travel is made after each command function is performed so that in effect, the station address of the command to be performed is compared to the address of a command function already performed in order to tell the stacker crane which direction it must travel to go directly to the next selected cubical station.

The last command function is preferably a HOME command function which instructs the stacker crane to return to the HOME station at the end of a sequence of several command functions. This enables the stacker crane to start a sequence of command functions from the HOME station.

The selection of tier or elevation direction is accomplished by a substantially identical binary comparison system. A vertical travel direction control system compares the binary pattern of the indicators at the present elevation of the shuttle forks of the stacker crane to the binary pattern of the tier address selection devices on the control console to instruct the shuttle fork carriage to either raise or lower to go directly to the selected tier of the next command function.

The present system therefore provides horizontal and vertical travel direction determination by what is in effect a loop reading system wherein the direction to the next command station and tier is determined by referring back to the last completed command station and tier. Thus, it is not necessary to refer back to some fixed station, such as a place of beginning or a home station. Further, with the loop reading system utilized in the present binary comparison system, a HOME station can be at any cubical station along the runway and at any cubical elevation. It is not necessary that a HOME pick up and/or discharge station be at the end of the crane runway. The present control systems readily admits to modularization so that the binary indicator reading devices each comprises a separate module which are cascaded in a command section. Each command function is performed by a separate command section. The command sections all comprise an equal number of address indicator reading modules. Additional address indicator reading modules are cascaded to service additional stations. Additional command functions are added by cascading additional command sections. The present system does not require the extensive cross wiring of other prior systems and has substantially less components. For example, the present system will provide a four-command system with approximately less than one third of the total number of components required in prior four-command systems.

In those systems utilizing a remote control console, very few connections are required between the control console and the stacker crane. Thus, the prior bus bar and collector type of remote control communication can be provided between the control console and the stacker crane. The unbilical cord between the stacker and the control console is not absolutely necessary, nor is the interface type of system. Any transients which may occur in the system as from jumping collectors do not affect either station address determination or direction of travel determination since the binary comparison system is always comparing the next selected station to the present location of the crane.

The present invention also contemplates a special arrangement of the address selecting devices to facilitate manual operation of the stacker crane and also manual address selection on the control console. As a practical matter, every operator cannot be expected to adapt to counting by twos as as necessary in a binary system when he has been long accustomed to counting in a decimal system. Although decimal-to-binary converters are well known and can be used to facilitate address selection and direction determination by decimal selectors such converters are cumbersome, complicated and result in the loss of binary positions for every ten positions on the decimal selector.

In the present system, the address selecting devices are individual switching devices, for example push buttons switches, which correspond in number to the number of binary pattern indicators and binary pattern indicator reading devices. A station or tier is selected by depressing those push buttons which correspond to the indicators which make up the binary pattern of the station address number to be selected.

In addition, the individual switching devices are numbered by units starting with one. Thus, the switching device which represents a binary value of one is indicated by the address number 1, the switching device representing a binary value of two is numbered 2, the switching device indicating a binary value of four is numbered 3, and so forth such that each additional switching device has the next higher address number by units and indicates the next higher element in the binary geometric series.

A cubical address is designated by the address numbers of the switching devices whose total binary value is equal to the station number for that cubicle. For example, the twenty-fifth cubical station along the stacker runway will be selected by depressing the push buttons having the address numbers 1, 4 and 5 since their corresponding binary values of 1, 8 and 16 respectively, total 25.

The address information for each load is often given to the operator on a business machine card or the like. To further facilitate correct manual address selection, zeros are provided in the address on an address card or the like for those push buttons which are not to be depressed. For example, the address for the station number 25 would be 10045. Using this type of addressing system enables the operator to determine whether to travel in a forward or reverse direction to go to the next selected cubical station because the address for a cubical station further up the aisle will always be higher than the address of the crane's present location and the cubical address of a station further down the aisle will always be lower than the crane's present position. In a preferred form of the addressing arrangement, the binary switching devices are arranged on the control console in a reverse order so that the highest binary value is at the left facing the operator and the lowest is to the right facing the operator. Their corresponding address numbers are arranged with the number "1" on the lowest binary value switching device which is on the right and progress by units to the left with the highest address number on the highest binary valued switching device on the far left. This gives the cubical stations further down the aisle an even higher appearing address than those up the aisle so that the operator can easily determine which direction to travel to go to the next selected station.

In the present system, the number of stations which can be serviced is limited more by the practical considerations of the amount of time required for the crane to travel from one station to another rather than on the limitations of the number of electrical components required. It is important therefore, in the present system that the stacker crane be able to travel at a maximum rate of speed, decelerate rapidly, and home-in accurately on a selected station. This raises severe inertia problems which also limits the top maximum speed that can be provided in the system. Stacking cranes often include 30 food masts which have large masses. The cranes travel at top speeds at least in excess of 100 feet per minute and often as high as 300 feet per minute. During crane travel to a selected station, the crane accelerates to a peak speed, slows down prior to reaching the selected cubicle and then lines up its load with the cubicle, preferably within a tolerance of a quarter inch. It is desired that the slow speed reached prior to reaching the selected cubicle and for aligning the load with the cubicle be as slow as possible to facilitate aligning or spotting the load with the cubicle.

Those prior stacker systems using variable speed motors have not proven satisfactory and are not capable of reaching high speeds because these motors provide generally only a fifty percent variation speed. Consequently, the crane can only slow to fifty percent of top speed and then must stop immediately. The final sudden change in motion overly stresses the crane system and is not satisfactory.

Many prior crane systems incorporate two speed motors having two speed windings. The reduced speed is obtained by switching to the lower speed winding. These crane systems provide a maximum practical ratio of 6 to 1 between the high and low speeds which is still not satisfactory for completely accurate spotting. In addition, the change in speed often takes effect almost substantially instantaneously again jarring the crane. This is particularly acute in the electrical systems wherein the motors lock in immediately on the line frequency.

A ratio between the top level speed and the slow spotting speed of 18 to 1 is preferred for maximum usable crane speed and highly accurate spotting. This is accomplished in the present system by utilizing a micro-speed motor in conjunction with a two speed motor having two speed windings. In the present system, the crane is caused to accelerate to a high speed as it travels towards a selected station. Upon reaching the selected station, the two speed motor is connected with its low speed winding in a reverse phase relation across the supply source to plug the two speed motor and cause it to decelerate. The crane decelerates to a standstill while overtraveling the selected station and then immediately starts moving in a reverse direction. The crane returns to a position just short of the selected station at which position the two speed motor is de-energized and a clutch mechanism connects the micro-motor to the crane drive system. The micro-motor brings the crane slowly to the selected station and accurately spots it with the centerline of the station.

With the latter system, plugging the motor to the point of standstill causes a gradual deceleration of the stacker which avoids the jarring associated with prior systems. The present motor control system permits, therefore, the highest maximum possible top or high speed to be used in any crane system.

Other advantages and a fuller understanding of the invention may be had by referring to the following specification taken in conjunction with the accompanying drawings in which.

Figure 1:
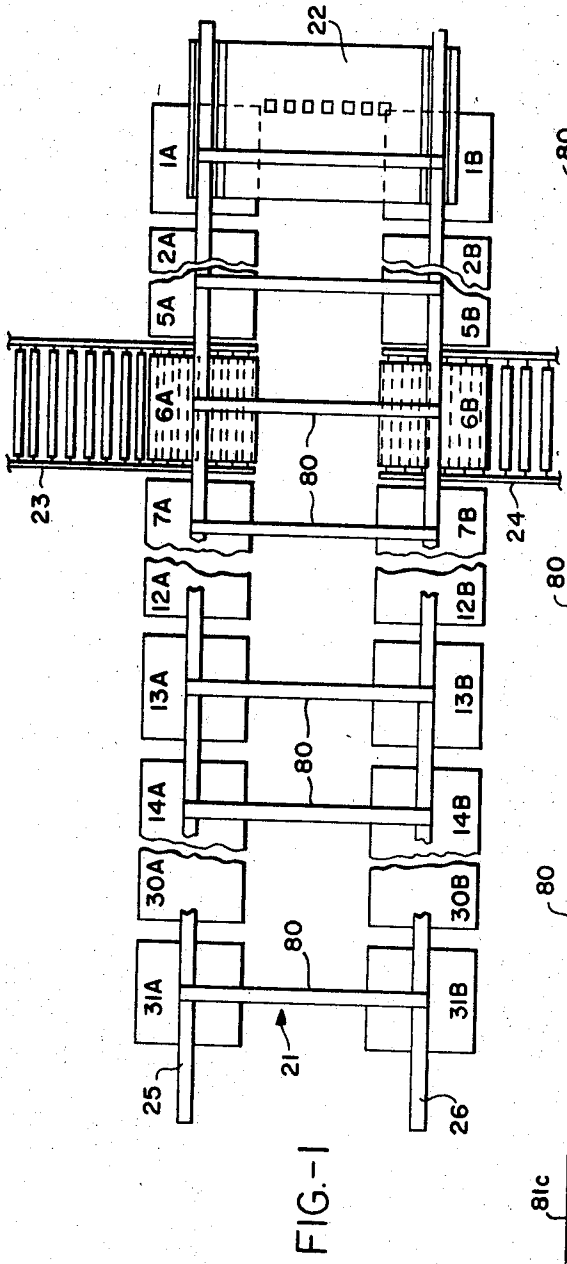
FIG. 1 is a top plan view of a load transfer and storage system utilizing the load transfer control system of the present system.

Referring now to FIG. 1, a stacker aisle 21 is provided between an "A" row of cubical stations 1A–31A and a "B" row of cubical stations 1B–31B. A pair of carrier rails or railways 25, 26 extend along the sides of the aisle 21 above the cubical stations. A stacker crane 22 is suspended from the railways 25, 26 and is movable along the rails through the aisle 21 between the rows of cubical stations.

Figure 7:
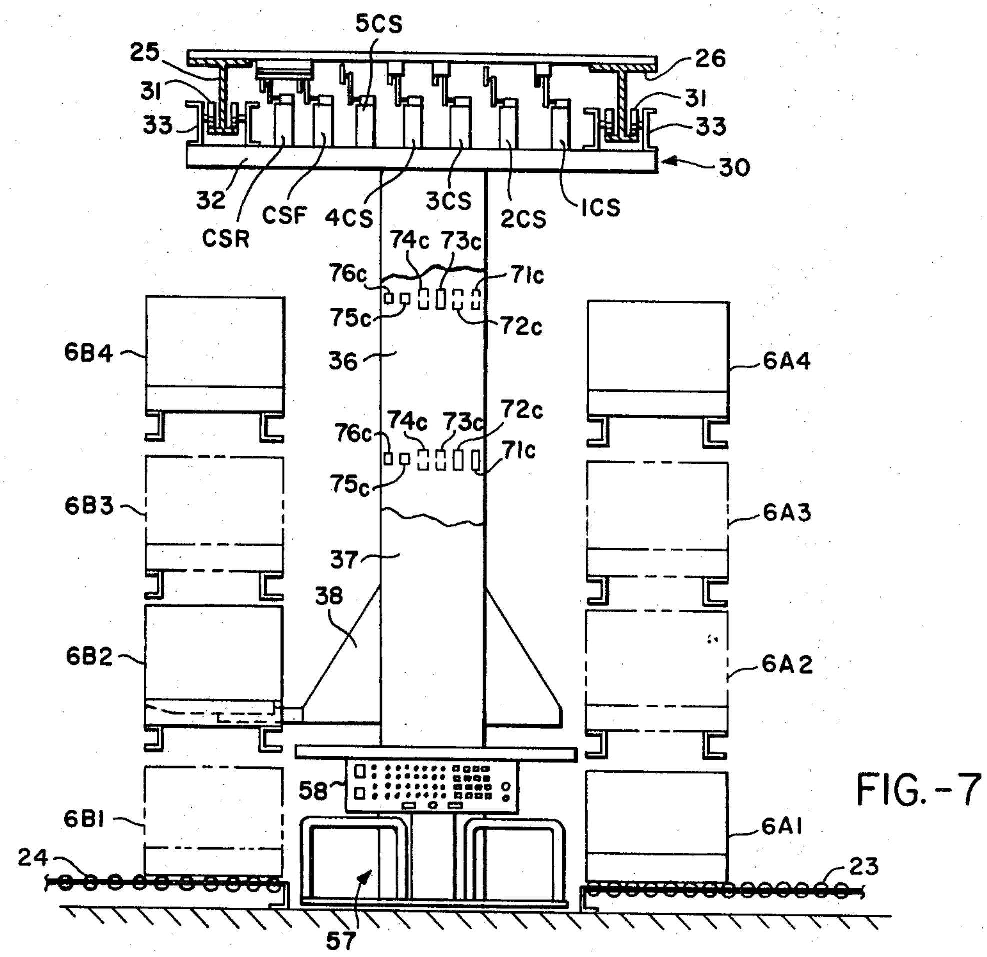
FIG. 7 is a front elevational view of the stacker crane system of FIGS. 1 and 6.

Several cubical stations have been omitted between the fragmentary cubical stations in each of the station rows A, B. As shown in FIG. 7, each cubical station 1A, 1B, 2A, 2B, etc., comprises several tiers of cubicles. Each cubicle is designated hereinafter by its cubical station 1A, 1B, 2A, 2B, etc., and its elevation number in a tier as a suffix. For example, the four cubicles tiered in the 2A station are designated 2A1 through 2A4. Each of the cubicles is adapted to support and contain a shipping box or container, plates or other like load 29. The cubicle 6A1 is a "pick-up" station cubicle through which the stacker crane obtains loads from outside the stations. The cubicle 6B1 is a "discharge" station cubicle through which the stacker crane delivers loads to the outside of the stations. Conveyors 23, 24 are provided for delivering loads to the "pick-up" home station cubicle 6A1 and removing loads from the "discharge" borne station cubicle 6B1, respectively.

Figure 13:
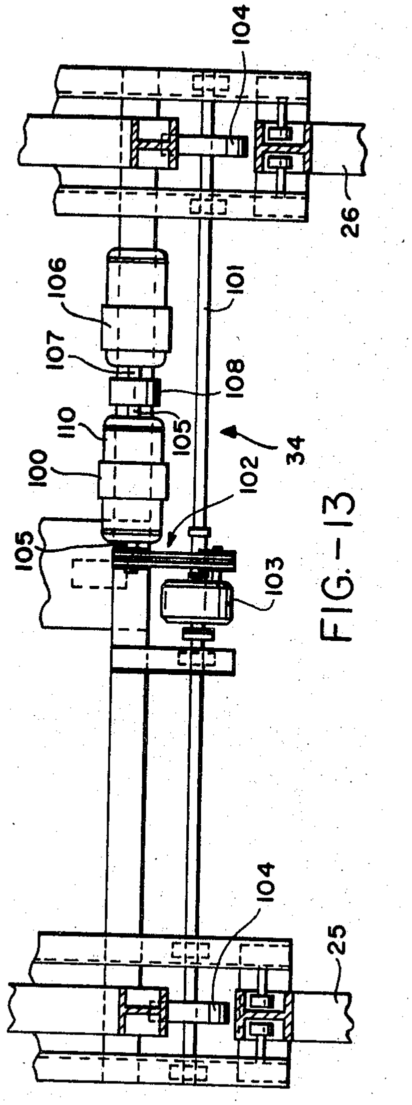
FIG. 13 is a bottom, plan view of the carrier platform of FIG. 11 showing the drive system for the stacker crane of the present invention.
Figure 6:
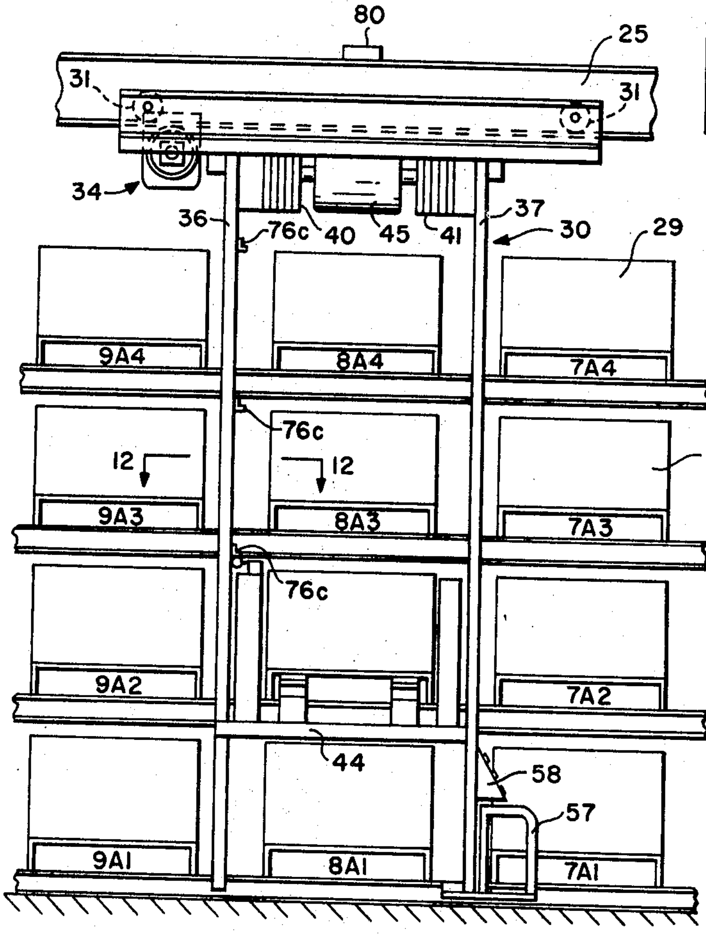
FIG. 6 is a side elevational view of the stacker crane and part of the storage system of FIG. 1.

The rails 25, 26 are T-beams or other suitable structural steel shapes for providing railways for the wheels of the stacker crane 22 in the conventional manner. Referring to FIGS. 6, 13, the stacker crane 22 includes a carrier 30 suspended from bottom small flanges of the T-beam rails by rollers 31. The rollers 31 are connected to a platform 32 of the carrier by channels 33. A travel drive unit 34 is carried by the platform 32 for propelling the stacker 22 along the railways.

A pair of masts 36, 37 are fixed to and suspended from the carrier platform 32. A shuttle fork carriage 38 is provided substantially between the stacker masts 36, 37. The fork carriage is carried by cables which are disposed within the masts 36, 37 and are reeved on hoist drums 40, 41 carried on the underside of the platform 32 and on idler drums (not shown) which are rotatably carried by a platform 44 of the fork carriage in the conventional manner. The hoisting drums 40, 41 are driven by a hoist drive unit 45. Operation of the hoist drive unit 45 causes the entire fork carriage 35 to slide along the stacker masts 36, 37 between the different elevations of the cubical tiers.

Figure 14:
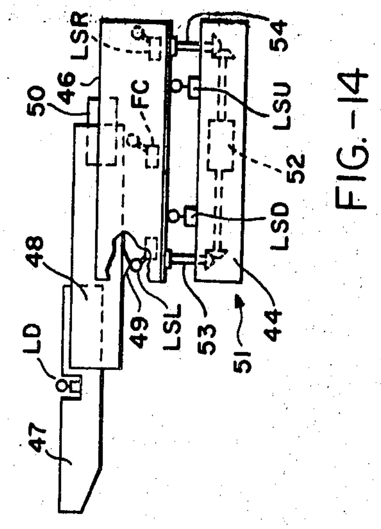
FIG. 14 is a side elevational view showing a shuttle fork carriage and shuttle forks limit switches utilized in the control system of the present invention.

A pair of shuttle forks 47, 48 and a fork translation drive unit 50 are carried by a shuttle fork carrier 46. The shuttle fork carrier 46 is carried by the platform 44. The fork translation drive unit 50 is a conventional unit for causing the shuttle forks 47, 48 to extend in a telescoping manner to either the left or to the right side of the carriage into either station row A or station row B. A limit switch actuator cam 49 is carried by the center of the shuttle fork 48 and engages the actuator of a shuttle fork center limit switch FC when the shuttle forks are in a dead center position relative to the fork carriage 38. The actuator cam 49 engages the actuator of an extreme right limit switch LSR when the shuttle forks are fully extended to the right and the actuator of an extreme left limit switch LSL when the shuttle forks are fully extended to the left as is shown in the drawing (see FIG. 14). A load detecting limit switch LD is carried by the shuttle fork 47 and has its actuator positioned so as to be engaged and moved by a load on the forks.

An auxiliary lift or hoist unit 51 is carried by the carriage platform 44 for moving the shuttle fork carrier 46 and the shuttle forks 47, 48 upwardly relative to the platform 44 to provide additional upward hoisting movement of the shuttle forks. The auxiliary hoist unit lifts the shuttle forks sufficiently to clear a load from the pick-up and discharge station conveyor 23, 24 and also from the cubical platforms. A suitable auxiliary lift unit comprises an auxiliary lift motor 52 which drives screws 53, 54 on which lifting blocks are threaded. The lifting blocks are attached to the shuttle fork carrier 46 and selectively raise or lower the shuttle forks depending upon the direction of rotation of the screws 53, 54 as driven by the auxiliary lift motor. An extreme up limit switch LSU and an extreme down limit switch LSD are carried by the fork carriage platform 44 for determining the elevation of the shuttle forks 47, 48 relative to the platform 44. The contacts of the up limit switch LSU are closed when the forks are fully raised by the auxiliary lift unit. The contacts of the down limit switch are closed when the forks are in a full down position relative to the carriage platform.

Figure 8:
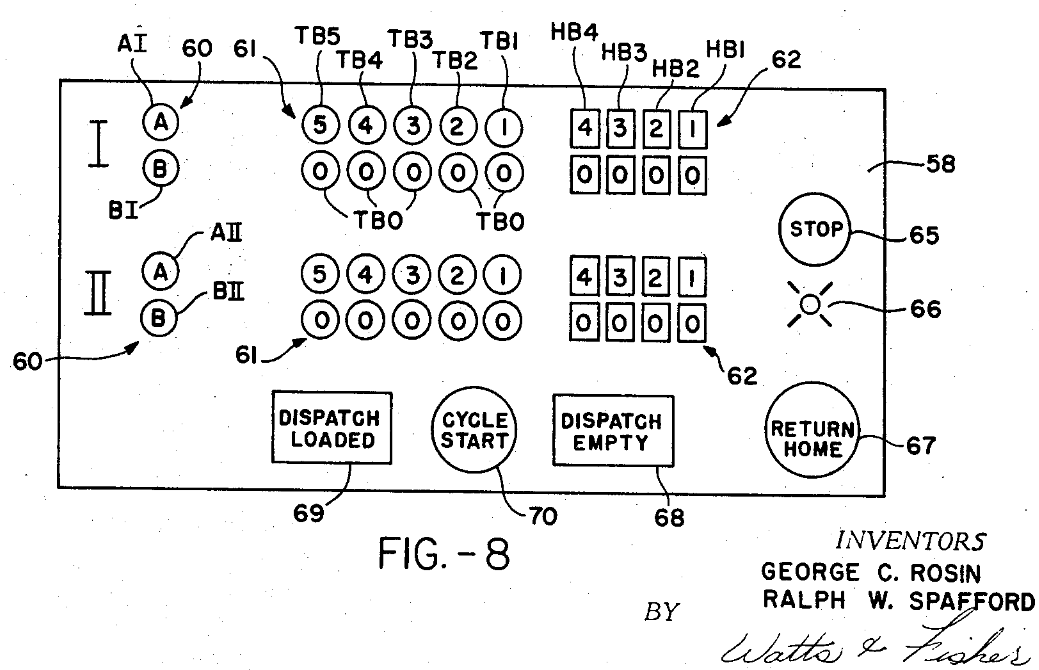
FIG. 8 is a plan view of a control console used by the stacker crane system of FIGS. 1–7.

An operator's platform 57 is carried by the masts 36, 37. A console 58 is carried by the operator's platform 57. The console 58 includes push buttons and other controls for programming and initiating automatic storage and retrieval command functions. A front panel of the console 58 is shown in FIG. 8 and includes two identical push button sections I, II for selection command functions. The upper section I includes push buttons for programming a first command function, e.g., a store function wherein the stacker crane picks up a load from the home cubicle 6A1 and delivers it to another cubicle probably at another cubical station along the aisle 21. The lower section II includes push buttons for programming a second command function, i.e., a retrieve function wherein the stacker 22 travels to pick up a load at one of the cubicals along the aisle 21 for delivery to the discharge home station cubicle 6B1.

Each command section I, II includes three push button groups 60–62. The first group 60 includes push buttons A, B which are A aisle side and B aisle side selection push buttons for selecting the side of the aisle into which the shuttle forks 47, 48 are to extend in the performance of a command function. The push button group 61 comprises an upper row of push buttons TB1–TB5 numbered 1–5 in reverse order and a lower row of push buttons which are depressed for selecting a cubical station along the aisle 21 at which the stacker will stop at the finish of its horizontal travel from another station. The third push button group 62 is depressed for selecting the elevation or tier of a cubicle at which the fork carriage is to stop when it finishes its vertical travel. The tier location push buttons comprise an upper row of push buttons HB1–HB4 numbered 1 to4 in reverse order and a lower row of push buttons HB0 are all numbered zero. The console 58 further includes a stop push button 65, an indicator light 66, a return home push button 67, a dispatch empty push button 68, a dispatch loaded push button 69 and a cycle start push button 70.

The second and third groups 61, 62 of push buttons TB0–TB5 and HB0–HB4 utilize a binary system for selecting the destination of the stacker crane. The push buttons represent the elements, in binary, of a progressive geometric series so that each push button represents a different value and a particular station or tier number is selected by actuating those push buttons whose total value is the station number. For example, in the station location group of push buttons 61, the push buttons TB1–TB5 and numbered 1 through 5 reading from right to left represent the elements of the binary geometric series 1, 2, 4, 8, 16, respectively. The five numbered push buttons TB1–TB5 and their corresponding zero push buttons TB0 in the station location selecting group 61 can therefore be used to select up to 31 station locations along the aisle 21. To illustrate, cubical station location 23 is selected by depressing push buttons TB1–TB3 and TB5 which are numbered 1, 2, 3, and 5 respectively. Their corresponding geometric series values of 1, 2, 4, and 16 add up to 23 which is the station location A23.

A zero push button TB0 or HB0 is depressed only when the numbered push button above it is not depressed during address selection. Thus, in selecting station 23 the zero push button TB0 opposite push button TB4 is depressed. The zero and numbered push buttons TB0–TB5 operate contacts (not shown) to provide an interlock such that a zero push button must be depressed below each numbered push button not depressed in order for the system to start. Thus, either a numbered push button or a zero push button must be depressed for each of the number locations to complete the selection of a travel address.

Tier or elevation selection is also by the binary system. The push buttons HB1–HB4 numbered 1 through 4 from right to left have binary geometric series values of 1, 2, 4, and 8 respectively. As an example, tier 3 at any cubical station is selected by depressing push buttons 1 and 2, their total value being 3. Again, a zero push button HB0 must be depressed below each of the numbered push buttons which are not depressed when selecting a tier address.

Figures 9, 10:
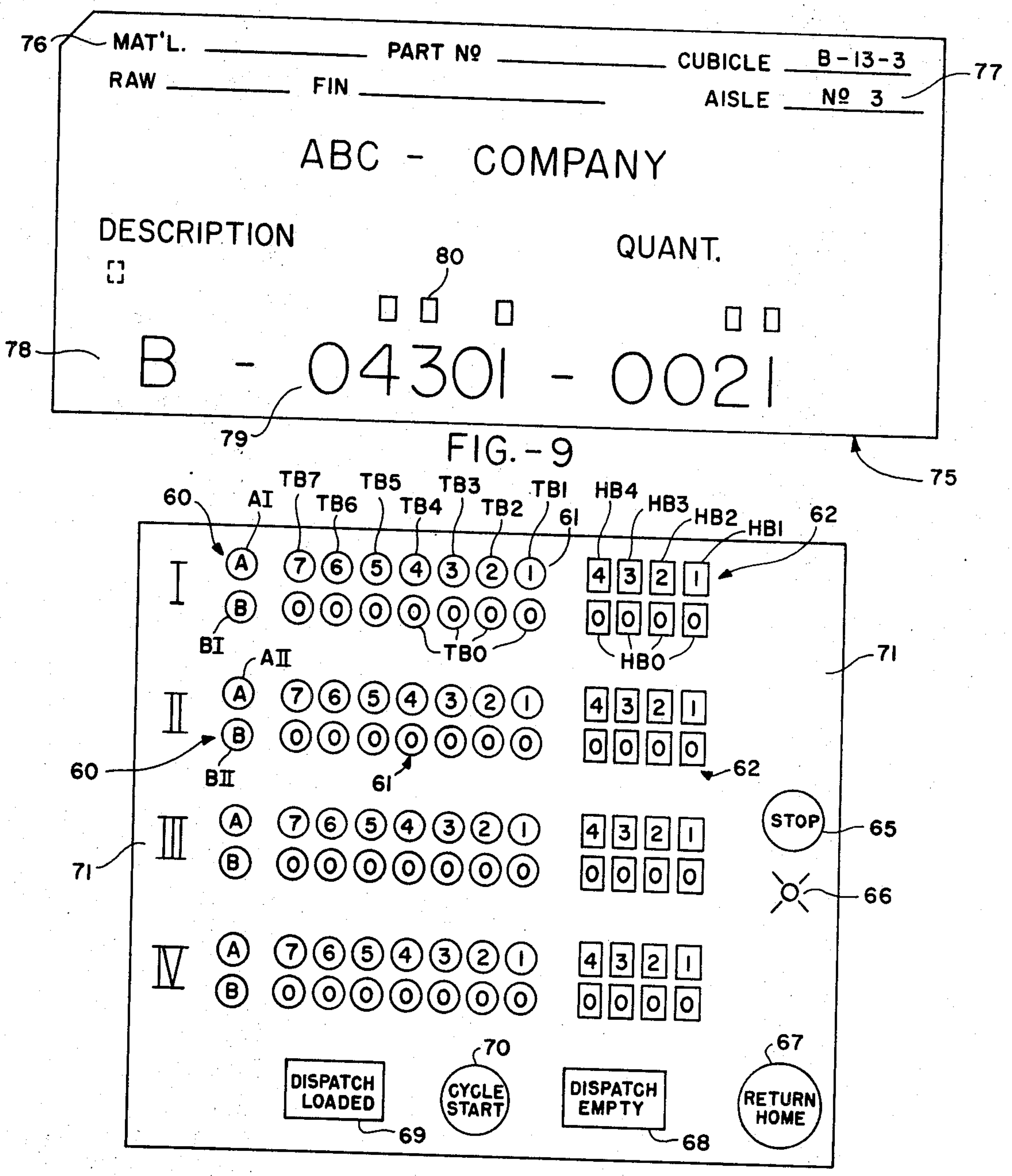
FIG. 9 is a plan view of an address card used with the control system of the present invention.
FIG. 10 is a plan view of an alternate embodiment of the control console of FIG. 8.

A four command console 71 is shown in FIG. 10. The four command console includes additional command sections III, IV. The push button group in each command section 61 includes seven station address push buttons TB1–TB7. The seven push buttons TB1–TB7 represent binary values of 1, 2, 4, 8, 16, 32 and 64 and can be used to select any one of 127 stations.

Referring to FIG. 9, a load address card 75 is shown for identifying the address of the cubicle from which a particular load is to be obtained or to which it is to be delivered. By address, it is meant the location of a cubicle in terms of its station location and its tier or elevation. An upper area 76 of the address card includes sufficient descriptive material to identify the nature of the load, quantity of the load, type of material, and a part number if any. An upper right hand corner 77 of the card 75 includes a short form designation of the cubical address to which the stacker is to travel to either deliver or retrieve the load designated by the card 75. As an example, the cubical designation for the particular load listed on the card is B–13–3 which is aisle side B, station 13 and tier 3. This corresponds to cubicle 13B3.

A lower area 78 of the card 75 includes cubical address information in at least two forms 79, 80 so that the address for a particular load can be easily programmed on the console 58 by an operator or by suitable electronic circuitry. The first form 79 is a numerical address, B–04301–0021, for the cubicle 13B3. The second form comprises perforations, inked squares or other indicia 80 which can be read by an automatic business machine. The card is perforated or otherwise marked opposite all numbers other than zeroes.

The characters in the numerical address 79 and their positions correspond exactly to the lettered and numbered push buttons in the push button groups 60–62 in each command section of the console 58. To select a particular cubicle, the operator depresses those push buttons whose letter and numbers appear on the card 75. For example, if the cubicle 13B3 is the cubicle to be reached during a first command function, then the operator depresses the push button B in the aisle selection group 60. The first number in the address is a zero and he pushes the push button TB0 in the lower row under the push button TB5. The next number is a four and he pushes push button TB4 in the upper row. The complete address is programmed by also pushing push button TB3 in the upper row, the push button TB0 under the push button TB2 and the push button TB1. In the tier selection group 63 of push buttons, the operator pushes push buttons HB0 under both push buttons HB4, HB3. He completes the tier selection by pushing the push buttons HB2–HB1 reading from left to right. If the address for cubicle 13B3 is programmed on the console and operation of the stacker initiated, then the stacker will travel down the aisle 21 and stop at station 13, lift its shuttle fork carriage 38 to tier No. 3 and cause the shuttle forks to extend into the cubicle on the B aisle side.

The provision of the row of zero push buttons TB0 and HB0 requires the operator to depress a push button for each character in the cubical address. This helps to prevent errors in selecting addresses.

The address arrangement using the numbers 1 through 5 and their corresponding binary geometric series values 1, 2, 4, 8, 16 both arranged in reverse order and the provision of zeroes for those numbers not a part of an address simplify determination by the operator as to the direction the stacker must travel to go from its present location to another cubicle. This arrangement povides that a station located further down the aisle toward the higher numbered stations will have a higher address number on the address card than those cubicles up the aisle 21 toward the lowered numbered end of the aisle. This address arrangement is therefore especially useful in a stacker installation not having or utilizing an automatic direction determining system as in the present invention and where the operator must decide his next direction of travel from the address on the card. For example, the operator may have several address cards instructing him to perform a sequence of several retrieval and storage functions. When the operator has finished one movement according to the address on one card, he then need only compare the address on the next card to his present address and determine whether or not the next address is higher or lower. If it is higher, then he moves further down the aisle towards the high numbered cubical stations. If it is a lower number, then he moves back towards the low numbered cubicles.

As will be described in greater detail below, the dispatch loaded push button 69 is depressed when a command function is to be started by taking a load from the home station cubicle 6A1 and delivering it to a storage position in another cubicle. The dispatch empty push button 68 is depressed when a command function is to be started with the shuttle forks empty and the stacker crane is first to go to a cubicle other than the home station cubicle to pick up a load. The cycle start push button 70 is used for starting a command function after programming the command functions to be performed. The return home push button 67 is depressed for causing the stacker to automatically return home to the home station cubicle 6A1 without performing any of the additional commands seelcted on the console 58. The indicator light 66 is illuminated when the stacker is running. The stop push button 65 is provided for causing the stacker to stop immediately.

STATION LOCATION AND TIER LOCATION INDICATION

The stacker 22 determines or identifies the number of each cubical station as it moves past that station. The apparatus for identifying each station also utilizes a binary arrangement. The identification apparatus includes a plurality of horizontal indicator support members 80 one for each of the cubical stations 1 through 32 as are shown in FIG. 1. The indicator support members 80 are located approximately in the center of each cubical station and are attached to the tops of the rails 25, 26 so that there is substantial space between the indicator supports 80 and the carriage platform 32 as the stacker moves under the supports 80.

Figure 11:
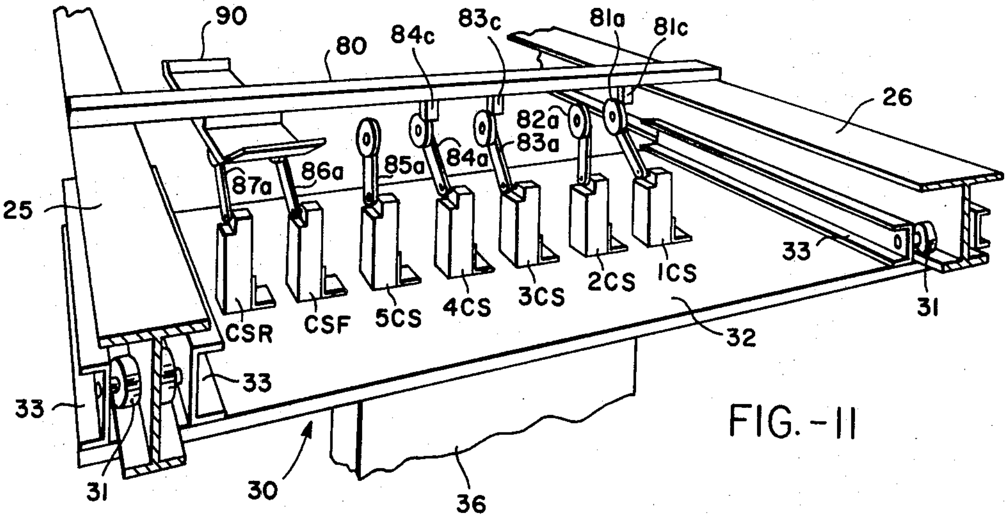
FIG. 11 is a perspective view of a carrier platform of the present crane system showing preferred forms of the station address indicators and station address reading devices of the present invention.

Referring to FIG. 11, a plurality of cam operated limit switches 1CS–5CS, CSF and CSR are fixed to the top of the platform 32 in the space between the platform 32 and the indicator supports 80. The limit switches 1CS–5CS, CSF and CSR include actuator arms 81*a*–87*a* which extend further upwardly from the limit switch bodies to unactuated positions where they just clear the underside of the supports 80.

As shown in FIGS. 2–5, the support 80 at each station location include one or more of five possible station identifying cam operators 81*c*–85*c* which project downwardly from the underside of the support member 80 so as to engage and move the actuator arms 81*a*–87*a* and operate the corresponding limit switches 1CS–5CS as the stacker carriage moves past the support 80. Each of the supports 80 also carry direction of travel movement indicating cam operators 90 at each cubical station. The cam operators 90 are positioned to engage and move the actuators of forward and reverse travel movement indicating cam switches CSR, CSF carried by the platform 32 as the stacker crane 22 moves along the aisle 21. Although the actuators of both switches CSF, CSR are moved by the cams 90 during either direction of movement, the contact of the forward cam switch CSF only is operated during forward movement and the contact of the reverse movement. The cam operators 90 are plates which extend beyond both sides of the support 80 so that the actuators of cam switches CSR and CSF are moved before the actuators of the cam switches 1CS–5CS during either direction of movement of the stacker. The cam operators 81*c*–85*c* and the limit switches 1CS–5CS have binary geometric series values of 1, 2, 4, 8, 16 respectively and correspond to the numbered push buttons TB1–TB5 on the console 58. Only those cam operators 81*c*–85*c* are provided at a particular station which will operate the actuator arms of those limit switches 1CS–5CS whose binary geometric series value will add up to provide the number of the cubical station.

Figure 2:
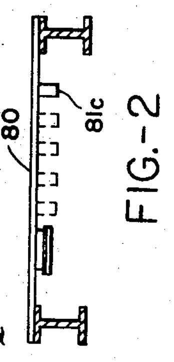
FIGS. 2–5 are side elevational views of several station address indicators for load support stations in the system of FIG. 1.
Figure 3:
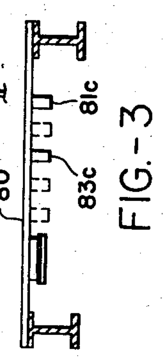
Figure 4:
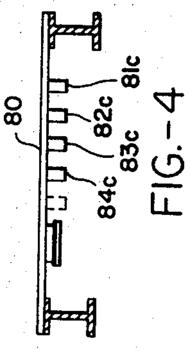
Figure 5:
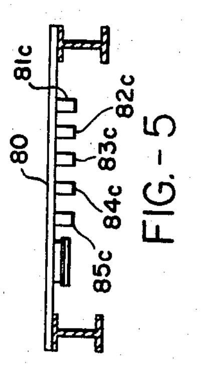

For example, in FIGS. 2–5, the cam operators provided at each station location are indicated in solid lines while the remaining possible came operators positions are indicated in phantom. FIG. 2 shows the cam operator arrangement for the first cubical stations 1A, 1B. Here only the first cam operator 81*c* is provided. In FIG. 3, cam operators 81*c*, 83*c* are provided and have a total binary geometric series value of 5 and therefore designate stations 5A, 5B. FIG. 4 includes cam operators 81*c* through 84*c* which have a total binary geometric series value of 15. They therefore indicate cubical stations 15A, 15B. In FIG. 5, the support 80 carries cams 81*c*–85*c* for a total binary geometric series value of 31 which is the last station location shown in the illustration in FIG. 1.

In FIG. 11, station identifying or indicating cams 81*c*, 83*c*, and 84*c* are provided to indicate station 13 which is the station address shown on the card 75. The actuators of cam switches 1CS, 3CS and 4CS are shown moved or actuated by the cams 81*c*, 83*c* and 84*c* so that the cam switches thereby "read" the binary, station identifying indicia provided by the cams to determine that they are at station 13.

Figure 12:
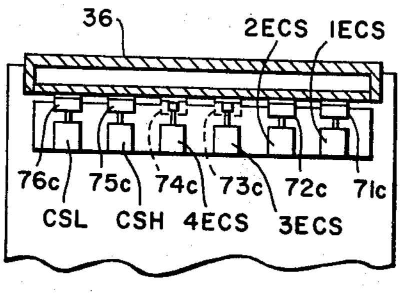
FIG. 12 is a top plan view, with parts in cross section, of preferred forms of the tier address indicator devices and address indicator reading devices of the crane system of the present invention.

Tier or elevation identification is provided by cam operators 71*c*–74*c* which are fixed to the inside surface of mast 36 nearly in line with the top of the containers 29 at each tier location (FIGS. 6, 7 and 12). Only those cam operators are provided in the cam operator positions at each tier as are needed to provide the binary indication of its elevation location. These are shown in solid lines. The other cam operator positions not utilized are shown in phantom. The cam operators are positioned to engage and move the actuators of hoist cam switches 1HCS–4HCS which are carried by the shuttle fork carriage 38 as the carriage moves up and down the masts 36, 37. The hoist cam switches 1HCS–4HCS represent binary series values of 1, 2, 4 and 8 respectively.

Hoist and lower movement indicating cam operators 75*c*, 76*c* are provided at each tier location in line with the tier location identification cam operators 71*c*–74*c*. The direction of movement indicating cam operators 75*c*, 76*c* engage and move the actuators of hoist and lower movement indicating limit switches CSH, CSL as the cam switches are carried past the operators 75*c*, 76*c* by the fork carriage 38. Although both cam operators 75*c*, 76*c* are moved by the cams, only the hoist movement indicating switch CSH is operated during a hoisting movement and only the lower movement indicating switch CSL is operated during a lowering movement.

As shown best in FIG. 7, the tier location identifying cams 71*c*–74*c* extended beyond both sides of the hoist and lower movement indicating cams 75*c*, 76*c*. The tier location identifying limit switches 1HCS–4HCS are therefore operated by the cams 71*c*–74*c* before either of the movement indicating switches CSH, CSL are operated by the cams 75*c*, 76*c*.

Although the preferred form of the station and tier identifying indicia and the indicia reading devices are the cam operators and the cam operated limit switches, it is understood other arrangements are suitable. For example, reflective strips or spots arranged in binary patterns on the cubicles are suitable station identifying indicia. The binary pattern of the reflective material at each cubical station is read by a lamp and photocell system. For example, a photoelectric device usable with a retro-reflective target as the reflective material is designated as PS510 by the General Electric Company.

Referring now to FIG. 13, the drive unit 34 includes a drive motor 100 carried by the underside of the carrier platform 32. An output shaft 105 of the motor 100 is connected to a main drive axle 101 through a belt and pulley system 102 and a gear reducer 103. The axle 101 is suitably journaled in cross members of the carrier frame. Rubber tired wheels 104 are secured to the ends of the drive axle 101 and are positioned so as to engage the bottom surfaces of the railways 25, 26 when the carrier 30 is mounted on the rails 25, 26.

A micromotor 106 is fixed to the underside of the platform 32 and includes a motor shaft 107 which is coaxial with the motor shaft 105 of the main drive motor 100. A clutch 108 is carried by the motor shafts 105, 107 and is selectively energizable to connect the micro-motor shaft 107 to the main motor shaft 105.

The main motor 100 is a three phase electric motor having two sets of three phase windings to provide two speed operation. It further includes an electric brake 110 for selectively braking the carrier. The micromotor 106 is preferably a three phase motor having a suitable parallel shaft, gear reducer to provide an output speed which is approximately 1/18 of the maximum speed of the main drive motor 100. A suitable micromotor for this purpose is a three phase, 900 r.p.m. motor commonly designated as frame G56DP4. A suitable clutch is designated as SFC400 Warner Eelectric Clutch No. 1–25533.

The function of the micromotor 106 is to provide a very slow, creeping speed operation of the stacker 22. This is provided by de-energizing the main motor 100, energizing the clutch 108 and energizing the micromotor 106 so that the micromotor drives the carrier drive axle 101 through the shaft 105 of the main motor 100.

Figures 15, 16:
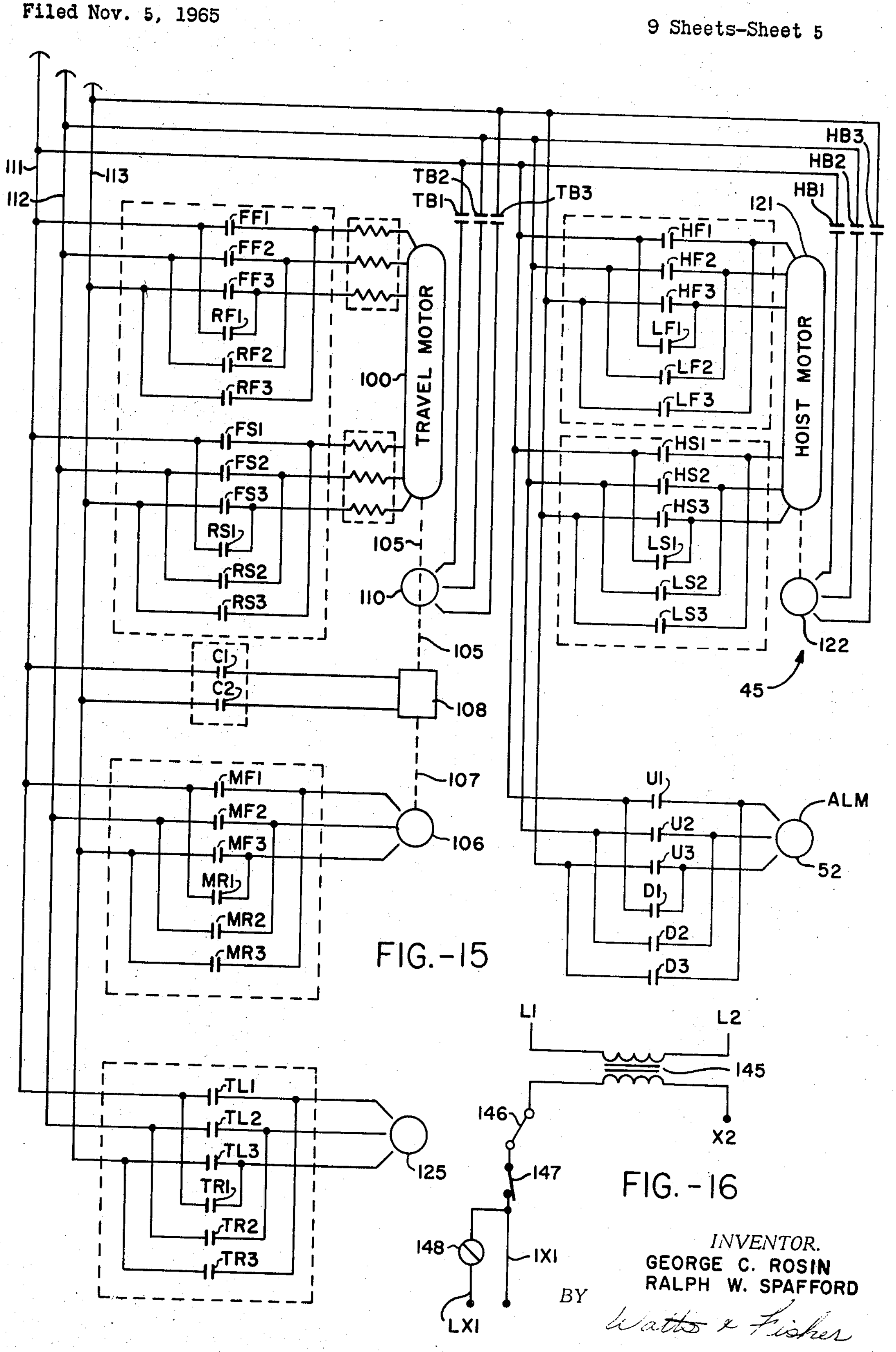
FIG. 15 is a circuit diagram showing the main supply circuits for drive systems of the stacker crane of the present invention.
FIG. 16 is a schematic drawing of an AC-DC supply system for the control circuits of the present invention.

Referring to FIG. 15, the two speed windings of the main travel motor 100 are shown schematically. The high speed windings of the motor 100 are connectable to three phase power supply lines 111–113 by forward fast contacts FF1–FF3 to provide fast forward operation, i.e., forward rotation of the motor shaft 105, and, consequently, forward travel of the stacker, and by reverse fast contacts RF1–RF3 to provide reverse, fast rotation of the motor shaft and, consequently, reverse travel of the stacker. The low speed windings of the motor 100 are connectable to the three phase power supply lines 111–113 by forward slow contacts FS1–FS3 to provide slow speed, forward operation and by reverse slow contacts RS1–RS3 to provide slow speed, reverse operation. The electric brake 110 for the motor 100 is connectable to the power supply lines 111–113 by the travel brake contacts TB1–TB3. The micromotor 106 is connectable to the power supply lines 111–113 by micro-forward contacts MF1–MF3 for forward, micro-speed travel of the carrier and by micro-reverse contacts MR1–MR3 for reverse, micro-speed travel of the carrier.

The hoist drive unit 45 includes a two speed, three phase hoist motor 121 and an electric hoist brake 122. High speed windings of the hoist motor 121 are connectable to the power supply lines 111–112 by hoist fast contacts HF1–HF3 for fast hoisting movement of the fork carriage 38 and lower fast contacts LF1–LF3 for fast lowering movement of the carriage 38. Low speed windings of the hoist motor 121 are connectable to the power supply lines 111–113 by hoist slow contacts HS1–HS3 for slow, hoisting movement of the fork carriage 38 and lower slow contacts LS1–LS3 for slow speed, lowering movement of the fork carriage 38. The electric brake 122 of the hoist motor 121 is connectable to the power supply lines by hoist brake contacts HB1–HB3.

The fork translation unit 49 includes a fork translation motor 125 which is connectable to the power supply lines 111–113 by translation left contacts TL1–TL3 for causing translational movement of the forks 47, 48 to the left of the carriage 38 and translation right contacts TR1–TR3 for causing the forks to move to the right of the fork carriage 38.

The auxiliary lift motor 52 is connectable to the power supply lines 111–113 by up contacts U1–U3 to energize the motor 52 to cause auxiliary lifting movement of the fork carrier and by down contacts D1–D3 for auxiliary downward or lowering movement of the fork carrier.

Figure 17:
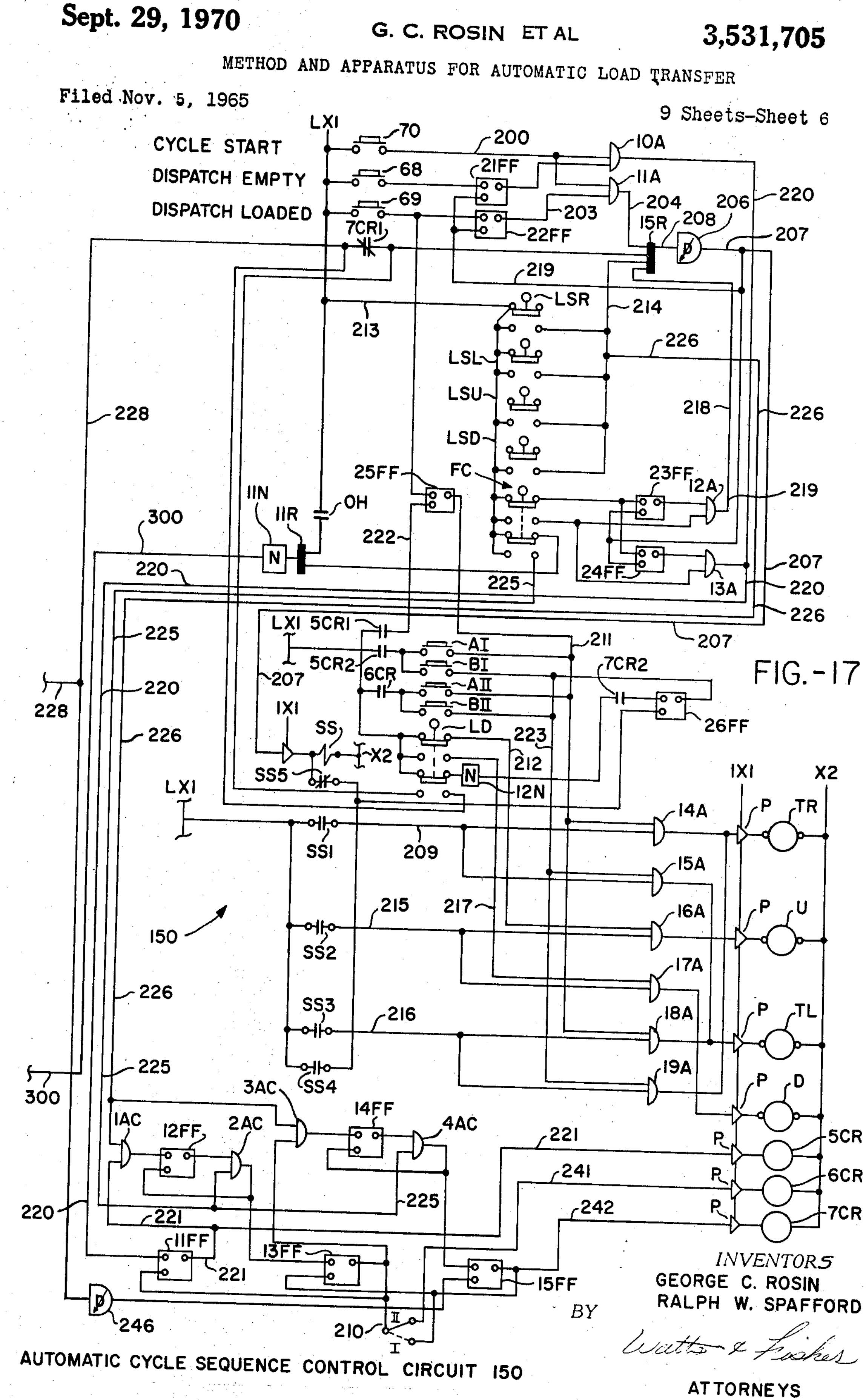
FIG. 17 is a circuit diagram of an automatic cycle sequence control circuit utilized in the load transfer system of the present invention.
Figure 18:
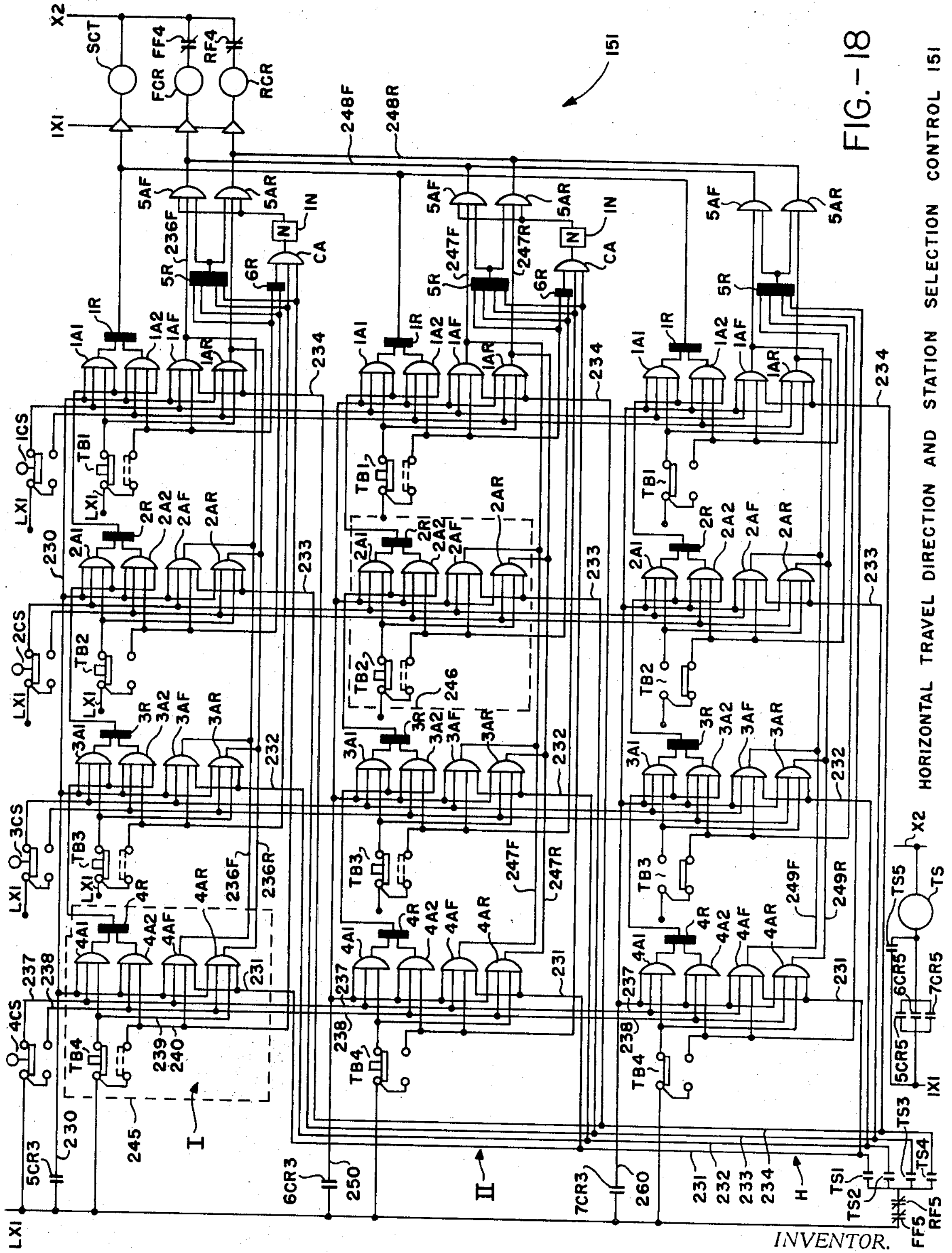
FIG. 18 is a circuit diagram of a horizontal travel direction and station selection control circuit utilized in the load transfer system of the present invention.
Figure 19:
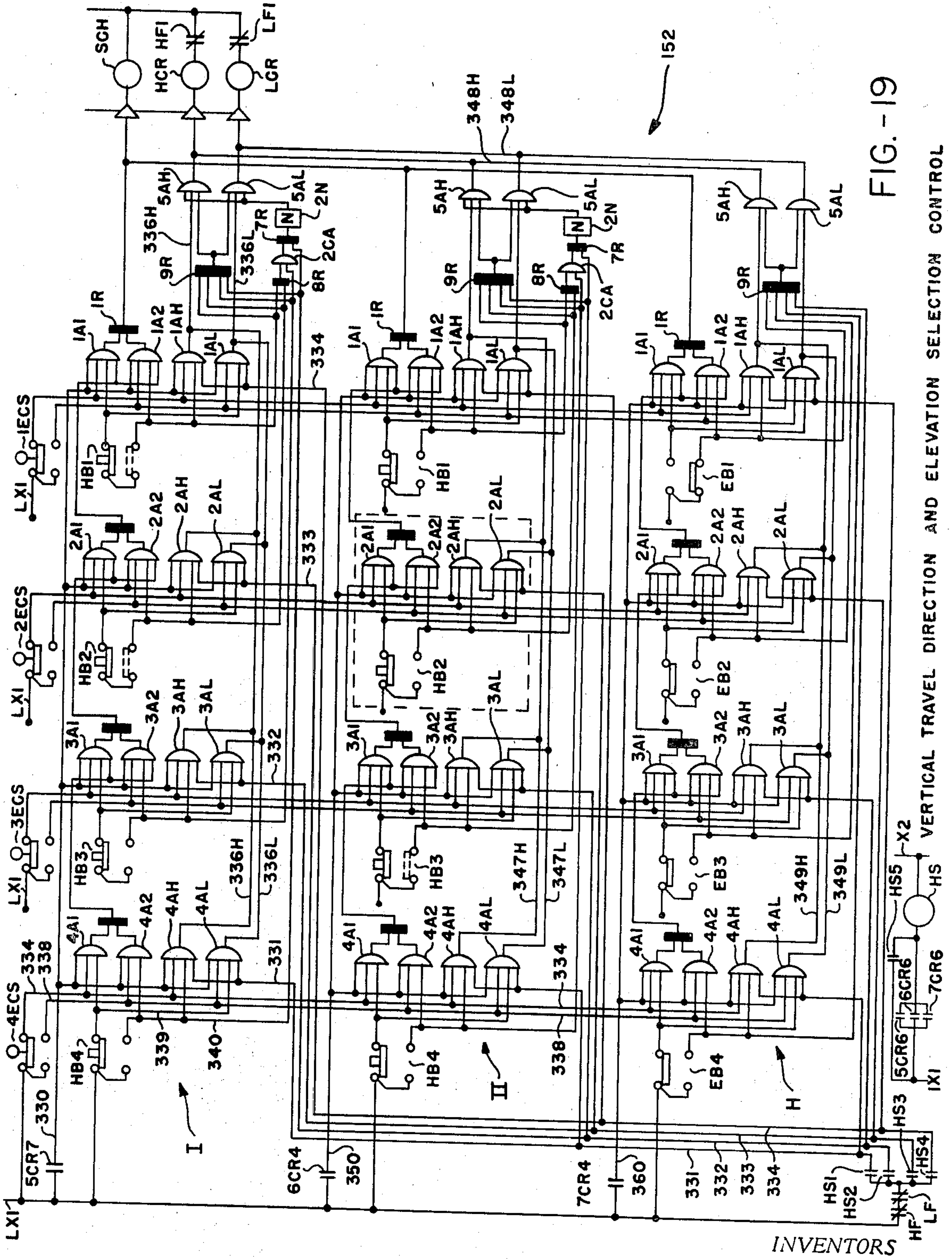
FIG. 19 is a circuit diagram of a vertical travel direction and elevation selection control circuit of the present invention; and, FIG. 20 is a schematic circuit diagram of vertical and horizontal station proximity homing control circuits utilized by the present invention.

The several motors 100, 106, 121, 125, 52, the electric brakes 110, 122 and the clutch 108 of the stacker system are controlled through their associated contacts to provide multi-command operation with completely automatic station and elevation selection and horizontal and vertical travel direction determination by the following:

(1) An automatic command function and fork cycle sequence control circuit 150 (FIG. 16);

(2) A horizontal travel direction and station selection control circuit 151 (FIG. 17);

(3) Vertical travel direction and elevation selection control circuit 152 (FIG. 18);

(4) A station proximity homing control circuit 153 (FIG. 19); and, (5) An elevation proximity homing control circuit 154 (FIG. 19).

Referring to FIG. 15, all of the control systems 150–154 are supplied from an AC supply source by supply lines L1, L2 which are connected to the primary winding of a step-down transformer 145. A secondary winding of the step-down transformer 145 provides a supply voltage of preferably 110 volts AC through a manual switch 146, and a pick-up home station monitor switch 147, to an AC supply conductor 1XI. The switch 147 is operated by an apparatus which monitors the load for size and position and opens in the event the load is oversized or out of position to prevent operation of the control systems 150–154. A signal converter 148, e.g., a rectifier, is provided for converting the AC supply voltage to a proper DC supply voltage for the control circuits 150–154 and is connected to a DC supply line conductor LX1.

For purposes of simplicity of explanation, the elements of the several control circuits 150–154 are shown wherever possible by conventional logic symbols. Reference is made to "Basics of Digital Computors" by John S. Murphy, John F. Rider, Publisher, Inc., and also to "Binary Logic" reprinted from Product Engineering, publication R101, for examples and explanations of the logic symbols used herein.

AUTOMATIC CYCLE SEQUENCE CONTROL CIRCUIT 150

The automatic cycle sequence control circuit 150 controls the operation of the shuttle forks and determines whether the forks go through a "pick-up" cycle or a "let-down" cycle and also the aisle side from which a load is to be obtained or into which it is to be deposited. The cycle sequence control circuit 150 also initiates operation of the horizontal travel direction and station selection control circuit 151 and the vertical travel direction and elevation selection control circuit 152 when appropriate after a fork cycle. The automatic cycle sequence and control circuit 150 further causes the commands I, II and the HOME command to be performed in the sequence and shuts all stacker control systems off at the end of the HOME command.

Referring to FIG. 16 the automatic cycle sequence control circuit 150 includes the dispatch empty push button switch 68, the dispatch loaded push button switch 69 and the cycle start push button switch 70. To start any command function, it is necessary to push the cycle start push button 70 and either the dispatch empty push button 68 or the dispatch loaded push button 69. Actuating the cycle start push button 70 and the dispatch empty push button 68 energizes the conductor 220 through an AND circuit 10A and a flip-flop 21FF. Energization of the conductor 220 triggers a flip-flop 11FF to in turn energize a control relay 5CR. The energized control relay 5CR initiates operation of a command I section in the travel direction and station selection control circuit 151 without causing the shuttle forks to go through a fork cycle beforehand as will be explained.

Actuation of the cycle start push button switch 70 and the dispatch loaded push button 69 energizes a first input of an OR circuit 15R through an AND circuit 11A and a flip-flop circuit 22FF via conductors 203, 204. Energization of any of the first two inputs of the OR circuit 15R initiates either a pick-up fork cycle or a let-down fork cycle in connection with either aisle A or aisle B as has been selected by the aisle selection push buttons AI, BI, AII and BII. The third and fourth inputs of the OR circuit 15R are selectively energized to continue a fork cycle once initiated.

The second input of the OR circuit 15R is connected to the horizontal and vertical travel proximity homing control circuits 153, 154 via conductor 228. An energizing signal appears on conductor 228 to energize the second input of the OR circuit 15R to initiate a fork cycle when the hoist and travel movements of the stacker have stopped after performing a command function.

The third input of the OR circuit 15R is connected to normally open contacts of the shuttle fork position determining limit switches LSR, LSL, LSU and LSD via a conductor 214. An energizing signal is provided to the third input of the OR circuit 15R to continue a fork cycle whenever one of the switches LSR, LSL, LSU, LSD closes its normally open contact to indicate that the shuttle fork has reached that particular extreme position.

The fourth input of the OR circuit 15R is energized to continue a fork cycle via a conductor 218 from an AND circuit 12A having first and second inputs. Energization of the two inputs of the AND circuit 12A is controlled by the fork center limit switch FC. The fork center limit switch FC has a first contact (normally closed) connected to the input of flip-flops 23FF, 24FF and a second contact (normally open) connected to the second inputs of AND circuits 12A, 13A. The first inputs of AND circuits 12A, 13A are connected to the outputs of the flip-flops 23FF, 24FF. The fork center switch is actuated to open its first contacts and close its second contacts when the forks are centered. The AND circuit 12A will have both of its inputs energized when an output of the flip-flop 23FF is first turned ON by closure of the first contact of switch FC to energize the first input of the AND circuit 12A and then the second contact of switch FC closes to energize the second input of AND circuit 12A. This occurs when the shuttle forks 47, 48 move out to the right to permit the fork center limit switch to return to its actuated position so that its first contact closes, and then the shuttle forks return to a center position actuating the fork center swich FC to close its second contact and open its first contact.

As shown, the aisle A selection push button switches AI, AII have one side of their contacts connected to an aisle A selection conductor 211. The output of a flip-flop 25FF is also connected to the aisle A selector conductor 211. Energization of the conductor 211 through any one of these switching devices AI, AII, 25FF, causes the shuttle forks to move to the right into aisle A during a fork cycle. The aisle B selection push buttons BI, BII have one side of their contacts connected to the aisle B selection conductor 223. The output of a flip-flop 26FF is also connected to conductor 223. Energization of the aisle B selection conductor 223 by one of the switching devices BI, BII, 26FF causes the shuttle forks to move to the left into aisle B during a fork cycle.

The load determining limit switch LD for determining when a load is on the shuttle forks is provided with four contacts, the first and third being normally closed and the second and fourth being normally open. The first and second contacts of the load presence determining switch LD are connected to the conductors 212, 217 respectively and determine whether the shuttle forks are going to go through a fork "pick-up" cycle or a fork "let-down" cycle. In other words, when a load is on the shuttle forks, the limit switch LD is actuated to open its first contact and close its second contact to deenergize conductor 212 and energize conductor 217. The energized conductor 217 indicates that a load is already on the shuttle forks and they must go through a let-down cycle. If the load presence determining limit switch LD is in its up, actuated position when a fork cycle is initiated, then the conductor 212 is energized to indicate that the shuttle forks are empty and should go through a pick-up cycle.

When an energizing signal is supplied to any one of the four inputs of the OR circuit 15R, the OR circuit 15R provides an energizing signal to the input of a time delay OFF circuit 206 via a conductor 208. The time delay OFF circuit 206 provides a momentary energizing signal or pulse at its output connected to a conductor 207 in response to the signal at its input.

An example (not shown) of a suitable delayed OFF circuit is a relay having a normally open contact connecting the conductor 207 to the supply conductor LXI via conductor 206 and a normally closed contact in the energizing circuit of the relay coil, the latter contact opening only after a momentary delay. When the relay coil is energized through the normally closed contact, its normally open contact closes immediately to energize conductor 207 and its normally closed contact opens after the delay period to de-energize the relay coil and open its normally open contact to de-energize conductor 207.

The energization of the conductor 207 is therefore in pulse form and is supplied as a stepping pulse to a solenoid SS of a stepping switch having contacts SS1–SS4 in its switch bank. A suitable stepping switch is an Eagle Signal, Bulletin 780 MT stepping switch. Each time the stepping switch receives a pulse from the OFF delay circuit 206, the stepping switch solenoid SS lifts a pawl and then drops the pawl to step the switch bank. The first pulse supplied to the stepping switch solenoid SS causes the contact SS1 to close and to energize the conductor 209 from the supply source conductor LXI. Conductor 209 is connected to the second inputs of a translation right AND circuit 14A and a translation left AND circuit 15A. Energization of conductor 209 causes an outward translational movement of the shuttle forks by energizing either the translational right contactor coil TR to cause the shuttle forks to move to the right or by energizing the translational left contactor coil TL to cause the shuttle forks to move to the left depending upon whether AND circuit 14A or AND circuit 15A has its first input energized from the aisle side selection conductors 211, 223 respectively. Energization of contactor coils TR, TL and all other coils of the control system 150–154 is across the AC supply lines 1X1, X2 through suitable amplifiers P. As an example, the amplifiers P comprise DC relays having normally open contacts for connecting the contactor coils TR, TL, etc. across the AC supply lines 1X1, X2 and their own respective coils connected to be energized by the branch circuit conductors to which they are shown connected.

A second energizing pulse supplied to the stepping switch solenoid SS from OR circuit 15R opens contact SS1 and closes contact SS2. The closed contact SS2 energizes a conductor 215 which is connected to the second inputs of AND circuits 16A, 17A and energizes them to set up either a lifting or a lowering movement of the shuttle forks depending upon whether the up contactor coil U is energized through AND circuit 16A or the down contactor coil D is energized through AND circuit 17A. The first inputs of the AND circuits 16A, 17A are connected to the first and second contacts of the load presence determining switch LD via conductors 212, 217, respectively. The up contactor coil U is energized when no load is on the forks and the load presence determining limit switch LD is not actuated so that its first contact is closed to energize the first input of the AND circuit 16A. The down contactor coil D is energized when the load presence determining limit switch is actuated by a load on the shuttle forks and its second contact is closed to energize the first input of the AND circuit 17A. Closure of the contact SS2 therefore initiates a "pick-up" cycle of the forks when the first input of AND circuit 16A is energized via conductor 217 from the second contact of the load determining switch LD, and a "let-down" cycle of the forks when the first input of AND circuit 17A is energized via conductor 217 from the second contact of the load determining switch.

A third stepping pulse supplied to the stepping switch solenoid SS opens contact SS2 and closes contact SS3 to energize conductor 216 and cause a return translational movement of the shuttle forks from the aisle side into which thy had extended during the outward translational movement. The translational left contactor coil TL is energized for the return shuttle fork movement when the AND circuit 18A has its first input energized by the aisle A selection conductor 211 and its second input energized from conductor 216. The translational right contactor coil TR is energized to cause the return shuttle fork movement when the AND circuit 19A has its first input energized from the B aisle side selection conductor 223 and its second input energized from conductor 216.

A fourth stepping pulse supplied to the stepping switch solenoid SS opens contact SS3 and closes contact SS4 to energize solenoid SS through a normally closed contact SS5 to cause the stepping switch to step completely through any remaining contacts in its multicontact bank whereupon contacts SS5 opens to stop the stepping switch and place it in position for closing contact SS1 to start another fork cycle.

Control relay 5CR, 6CR and 7CR are provided to properly sequence operation of command I, command II, and HOME command sections in the horizontal and vertical travel control circuits 151, 152 in relation to each other and to set up each fork cycle. When energized, the control relay 5CR operates its contacts 5CR1–5CR6 in the control circuits 150–152 to initiate travel and hoist operations followed by a homing proximity operation immediately after the cycle start push button 70 is closed if the stacker is dispatched empty from the HOME station and after a "pick-up" cycle if the stacker is dispatch loaded. The control relay 5CR is energized by energization of conductor 221 from the output of the flip-flop 11FF when the flip-flop 11FF is turned on by a signal on conductor 220 from either the output of AND circuit 13A or the output of AND circuit 10A. The flip-flop 11FF is turned on by the AND circuit 10A when the dispatch empty and cycle start push button switches 68, 70 are closed to start a command function with the stacker traveling empty from the HOME station. The AND circuit 13A turns the flip-flop 11FF on when the fork center switch FC is actuated by the shuttle forks returning to the center position after going through a fork cycle. An output from the AND circuit 13A therefore signals that a pick-up fork cycle has been completed and the stacker can perform the travel and hoist functions of the selected command.

The second command function is initiated by energizing the control relay 6CR from an energizing signal on conductor 241 when the output of flip-flop 13FF is turned on. The output of the flip-flop 13FF is turned on by an output of an AND circuit 2AC when it has its two inputs energized, one by an energizing signal on conductor 225 and the other by the output of a flip-flop 12FF. An energizing signal appears on conductor 225 when a fourth contact (normally open) of the fork center switch FC is closed indicating that the shuttle forks are centered. The flip-flop 12FF has its output turned on when an AND circuit 1AC has its two inputs energized, one from the output of the flip-flop 11FF to indicate that the command I function has been completed and the other input by an energizing signal appearing on conductor 226. The conductor 226 is energized by closure of the normally open contacts of extreme left limit switch LSL or the extreme right light switch LSR when the shuttle forks reach either extreme position during a fork cycle. The output of the AND circuit 2AC is also connected to the reset input of the flip-flop 12FF to turn the output of the flip-flop 12FF off after a suitable delay. Thus, the second command is initiated by energization of the control relay 6CR at the end of the fork cycle which completes the first command provided three conditions are met; namely, (1) that the command I function has been performed as is indicated by turning the output of the flip-flop 11FF on, and (2) that the shuttle forks are in a centered position after (3) having been either to an extreme right or to an extreme left position.

The HOME command is initiated at the end of the fork cycle which completes the previous command function by energization of the control relay 7CR. Relay 7CR is energized by the conductor 242 when the output of flip-flop 15FF is turned on. The output of the flip-flop 15FF is turned on by an AND circuit 4AC when its two inputs are energized, one by the conductor 225 and the other by the output of the flip-flop 14FF. The output of flip-flop 14FF is turned on by an AND circuit 3AC having one input connected to the conductor 226 and the other input connected to the output of the flip-flop circuit 13FF. Thus, the control relay 7CR is energized to initiate the HOME command when three conditions are met; namely, (1) the second command has been performed as indicated by the output of the flip-flop 13FF; and (2) the forks are in the center position after (3) having been to an extreme left or to an extreme right position.

The automatic cycle sequence control circuit 150 can be modified to provide the HOME command immediately following a first command by means of a command selector switch 210. The selector switch 210 is movable to engage either of two fixed contacts I, II. Positioning the selector switch 210 at the contact II as shown in solid lines provides the HOME command after the first and second commands have been performed. Positioning the selector switch 210 to the contact I connect the output of the flip-flop 13FF directly to conductor 242 to energize the control relay 7CR rather than the control relay 6CR thereby performing the HOME command rather than the second command after completion of the first command.

Energization of the control relay 7CR to initiate a HOME command also initiates circuitry to shut down the control systems 150–154 after the HOME command function is completed. The energized control relay 7CR opens its normally closed contact 7CR1 and closes its contact 7CR2. The opened contact 7CR1 prevents energization of the second input of the OR circuit 15R by the conductor 228 at the end of the travel and hoist operations of the HOME command except when the fourth contact of the load determining switch LD is closed to therefore by-pass the normally closed contact 7CR1. The fourth contact of switch LD is closed to maintain the conductor 228 connected to the second input of the OR circuit 15R whenever a load is on the shuttle forks to assure a fork let-down cycle after termination of the proximity homing functions. At the end of the let-down cycle there is no longer a load on the shuttle forks and the fourth contact of the switch LD opens to maintain the second input of the OR circuit 15R de-energized and to prevent the initiation of any further fork cycles.

The normally open contacts 7CR2 when closed turn the output of flip-flop 26FF on at the moment the third contact of the load determinig switch LD opens to de-energized the input of a NOT circuit 12A. This happens when the forks pick up a load during a fork cycle in the HOME command function. The output of the flip-flop 26FF energizes the ailse B selection conductor 223 so that a load on the shuttle forks is delivered to the HOME station receiving cubicle in aisle B at the completion of the HOME command.

HORIZONTAL TRAVEL DIRECTION AND STATION SELECTION CONTROL CIRCUIT 151

Referring to FIG. 17, the travel direction and station selection control circuit 151 is divided into three command sections I, II and H. The command I and command II sections correspond to the command I and command II push button groups on the control console 58. The HOME command section H is permanently wired in the control system to cause the stacker to return tot he HOME station 6 when it finishes a storage function or a retrieval function as is programmed by the push buttons on the control console.

Each of the command sections I, II and H include several identical AND circuit modules, typical modules being outlined by broken lines 245, 246 in the command I and command II sections, respectively. The several modules from right to left in each of the command sections I, II and H correspond to binary values of 1, 2, and 4 and 8 in a binary geometric progression respectively. The module 245 represents a binary value of 8. The module to the right of the binary 8 module 245 represents a binary value of 4, the module to the right of the binary 4 module represents a binary value of 1. The binary modules in each of the command sections thus have a binary value which corresponds to the binary value represented by the particular cam switch ofthe station location indicating cam switches 1CS–4CS located immediately above it in FIG. 17 and also to the pushbuttons TB1–TB4 shown within the modules. Only four modules are shown in each command section for purposes of brevity of illustration. The four modules shown provide automatic station selection and travel direction determination for up to fifteen stations. Thus, it is to be understood that a fifth module to represent binary 16 is provided for pushbutton TB5 and cam switch CS5 for up to a 31 station installation as previously described. Still more modules may be added in each command section for additional stations, each additional module representing the next binary value. The control system is still further flexible in that additional command sections may be provided as may be needed by interposing them before the HOME command section.

Each binary module comprises four AND circuits, an OR circuit, and the cubicle address register pushbutton switches TB1–TB4 operated by the pushbuttons on the control console 58. OR circuits 2R–4R and a first pair of AND circuits 1A1–4A1 and 1A2–4A2 in the AND circuit modules of each command section together comprise a station selection or seeking portion of their particular command section. The AND circuits 1A1–4A1 and 1A2–4A2 compare the cubicle address registered on the control console 58 and in the control circuit 151 by the push buttons TB1–TB4 to the present position of the stacker as is indicated by the station location indicating cam switches 1CS–4CS. When the stacker is at the cubicle station whose address is identical to the address registered by the push buttons TB1–TB4 then the AND circuits 1A1–4A1 and 1A2–4A2 provide an energizing signal to a stop relay coil SCT to stop the stacker travel.

The second pair of AND circuits 1AF–4AF and 1AR–4AR in the modules of each command section comprise together the command section portion that determines the direction the stacker crane must travel to execute the programmed command function. The AND circuits 1AF–4AF and 1AR–4AR compare the address registered by the push buttons TB1–TB4 to the present location of the stacker as is indicated by the cam switches 1CS–4CS and determines whether the stacker must go in a forward or in a reverse direction to go directly to the cubicle address registered by the push buttons TB1–TB4. If the stacker must go in a forward direction, then one of the forward AND circuits 1AF–4AF sends an energizing signal to the forward travel relay coil FCR. If the stacker must go in a reverse direction, then one of the reverse AND circuits 1AR–4AR sends an energizing signal to the reverse travel relay coil RCR.

The direction determining and station selecting portions of each of the command sections I, II and H cannot perform their functions until closure of normally open contacts 5CR3, 6CR3 and 7CR3 in conductors 230, 250 and 260, respectively. The conductors 230, 250 and 260 connect the first inputs of all of the AND circuits in the command sections I, II and H respectively to the supply conductor LX1. The contacts 5CR3, 6CR3, and 7CR3 are operated sequentially by the relay coils 5CR, 6CR and 7CR respectively in the automatic cycle sequence control circuit 150 so that a command II functions follows a command I function and a HOME command function follows a command II function. The relay 5CR closes its contact 5CR3 to initiate the command I function. The contact 6CR3 is closed by the relay 6CR after a command I function has been performed and the HOME command contact 7CR3 is closed by relay 7CR after the command II function has been performed.

The direction of travel determining AND circuits 1AF–4AF and 1AR–4AR in each module energize either the forward travel relay coil FCR or the reverse travel relay coil RCR by closure of normally open contacts TS1–TS4 in conductors 231–234 respectively. The conductors 231–234 connect the fourth inputs of the AND circuits 1AF–4AF and 1AR–4AR to the supply conductors LX1 only when the contacts TS1–TS4 are closed.

The normally open contacts TS1–TS4 are closed in sequence, one at a time, in their numerical order of designation by a stepping switch motor TS. The contacts TS1–TS4 are closed in sequence such that a previously closed contact opens before the closure of a succeeding contact. The stepping switch motor TS is energized by the closure of any one of parallel connected normally open contacts 5CR5, 6CR5 and 7CR5 which connect the motor TS across the supply lines 1X1, X2. A holding contact TS5 maintains the motor TS energized until it has run through its entire bank of switch contacts TS1–TS4. The sequence of closure of the normally open contacts TS1–TS4 is such as to energize the fourth input of the AND circuits 1AF–4AF, 1AR–4AR in sequence starting first in the module representing the highest binary value to the module representing the lowest binary value. In other words, the TS1 contact closes first to connect the fourth inputs of the forward and reverse AND circuits AF, AR in the binary 8 module first, then in the binary 4 module, then in the binary 2 module and finally in the binary 1 module of each command section.

A forward fast contact FF5 and a reverse fast contact RF5 are interposed in series between the supply conductor LX1 and the parallel connected stepping switch contacts TS1–TS4. One of the contacts FF5, RF5 will be open whenever the stacker is traveling and will prevent the energization of the fourth inputs of the AND circuits 1AF–4AF and 1AR–4AR and consequently will prevent operation of the direction determining portions of the command sections.

DETERMINATION OF DIRECTION STACKER MUST TRAVEL

In the binary 9 module of the command I section, the second input of the AND circuit 4AF is connectable to the supply line conductor LXI by a normally closed first contact of the binary 8 switch 4CS and a conductor 237. The third input of the forward AND circuit 4AF is connectable to the supply conductor LXI via a normally open, second contact of the push button switch TB4 and a conductor 240. The second input of the reverse AND circuit 4AR is connectable to the supply conductor LXI by a normally open second contact of the cam switch 4CS and a conductor 238. The third input of the reverse AND circuit 4AR is connectable to the supply conductor LXI by a normally closed first contact to the push buton switch TB4 and a conductor 239.

As shown in the control circuit 151 (FIG. 17), the second and third inputs of the forward AND circuit 4AF are both energized when the normally closed first contact of the cam switch 4CS and the normally open second contact of the push buton switch TB4 are both closed. The second and third inputs of the reverse AND circuit 4AR are both energized when the normally open second contact of the cam switch 4CS and the normally closed first contact of the push button switch TB4 are closed. It is to be noted from the drawing then, that when the cam switch 4CS is in the same position as the push buton switch TB4 (both are up so that both have their first contacts closed or both are down so that both have their second contacts closed) then neither the forward AND circuit 4AF nor the reverse AND circuit 4AR has both its second and third inputs energized. Thus, neither the forward AND circuit 4AF nor the reverse AND circuit 4AR is energized except when the positions of the cam switch 4CS and the push button switch TB4 differ, i.e., when one switch is up so that its first contact is closed and the other switch is down so that its second contact is closed.

The forward and reverse AND circuits 1AF–4AF and 1AR–4AR in the modules of all of the command sections I, II and H are connected in an identical manner to the cam switches 1CS–4CS and their push buttons TB1–TB4. In other words, the second and third inputs of either the forward AND circuit or the reverse AND circuit in each module are energized only when the position of the cam switch differs from the position of the push button switch associated with that module.

The outputs of the forward AND circuits 1AF–4AF of all of the modules in all three command sections I, II and H are connected to the forward direction control relay FCR via conductors 236F, 247F, 248F, 249F respectively. The outputs of the reverse AND circuits 1AR–4AR in all three command sections I, II and H are connected to the reverse direction control relay RCR by the conductors 236R, 247R, 248R, 249R, respectively. When one of the forward direction AND circuits 1AF–4AF has its second and third inputs energized then the forward coil FCR is energized to cause forward travel of the stacker crane provided its first and fourth inputs are energized. When one of the reverse direction AND cubicles 1AR–4AR has its second and third inputs energized then the reverse coil RCR is energized to cause reverse travel of the stacker, provided its first and fourth inputs are energized.

Thus, the second and third inputs of the forward and reverse AND circuits in each of the modules of a command section constitute individual comparison circuits which compare the positions of the cam switches 1CS–4CS to the positions of the cubicle address selection push butons TB1–TB4. If the binary address to which the stacker is to travel, as is registered on the control console by the push buttons TB1–TB4, is higher than the address of the station at which the stacker is presently located, then the stacker must travel in a forward direction down the aisle toward the higher numbered cubicle stations and one of the forward AND circuits 1AF–4AF provides an energizing signal to the forward direction control relay FCR to start forward travel of the stacker. If the address selected by the push buttons TB1–TB4 is lower than the present position of the stacker crane as indicated by the cam switches 1CS–4CS, then the stacker must travel in a reverse direction and one of the reverse AND circuits will provide an energizing signal to the reverse direction relay coil RCR to start reverse direction movement of the stacker.

The direction of travel determination is further made by comparing the positions of the cam switch and travel selection push button having the highest binary value first, i.e., cam switch 4CS and push button TB4 in the system shown. If the positions of the cam switch 4CS and the push button TB4 are the same (both up or both down) so that neither AND circuit 4AF nor AND circuit 4AR is energized, then the positions of the cam switch 3CS and the push button TB3 are compared. If the positions of the cam switch 3CS and the push button TB3 are the same, then the positions of the cam switch 2CS and the push button TB2 are compared, and so forth until a cam switch and push button are reached whose positions differ. This sequential comparison of the cam switches and push buttons in each module in a command section is accomplished by the sequential energization of the conductors 231–234 by contacts TS1–TS4 which sequentially provide a signal to the fourth inputs of the forward and reverse AND circuits in each module of a command section. In other words, as the sequential comparison is made and the first module is reached wherein the positions of the cam switch and push button switch differ, then all four inputs of the forward direction AND circuits for that module is energized only when (1) its command section contact 5CR3, 6CR3 or 7CR3 is closed, (2) its particular module selection contact TS1–TS4 is closed, (3) the normally closed first contact of its associated cam switch is closed, and (4) the normally open second contact of its travel selection push button is closed. In this condition, the closed second contact of the push button switch indicates a finite binary value as compared to a binary value of 0 indicated by the closed first contact of the cam switch so that it is apparent that the address registered on the command console by the push button selection switches TB1–TB4 is higher than the present position of the stacker as is indicated by the cam switches 1CS–4CS. The stacker must therefore travel in a forward direction to reach the selected cubical station.

All four inputs of the reverse AND circuits of that module are energized only (1) when the command section contact 5CR3, 5CR4, or 7CR3 is closed, (2) its module selection contacts TS1, TS2, TS3 or TS4 is closed, (3) the normally open second contact of its cam switch is closed, and (4) the normally closed, first contact of its push button switch is closed. The comparison between the push buttons in this condition is such that the closed second contact of the cam switch has a finite value as compared to a zero value indicated by the closed, first contact of the push buton switch. This indicates that the stacker is presently at a station address which is higher than the addressed registered on the command console so that the stacker must travel in a reverse direction to reach the cubical station registered on the command console.

SELECTION STATION IDENTIFICATION

As the stacker 22 travels through the aisle 21, the station location of the cubicle whose address is registered by the push buttons TB1–TB4 is determined by the AND circuits 1A1–4A1 and 1A2–4A2. The first inputs of the AND circuits 4A1, 4A2 in the highest binary value modules of the command sections I, II and H are energized from the supply conductor LX1 by closure of the normally open contacts 5CR3, 6CR3 and 7CR3 in the conductors 230, 250, 260. The second and third inputs of the AND circuits 4A1, 4A2, constitute a comparison circuit for comparing the relative positions of the cam switch 4CS and the push button switch TB4. The second and third inputs of the AND circuit 4A1 are connectable to the supply conductor LX1 through the normally closed first contacts of the cam switch 4CS and of the push button switch TB4, respectively. The second and third inputs of the AND circuit 4A2 are connectable to the supply conductor through normally open, second contacts of the cam switch 4CS and of the push button switch TB4, respectively. An OR circuit 4R has both of its inputs connected to the outputs of the AND circuits 4A1, 4A2. The output of the OR circuit 4R is connected to the fourth input of the AND circuit 3A1, 3A2 of the next lower value binary module, which is the binary 4 module in the system illustrated in FIG. 17.

If the cam switch 4CS and the push button switch TB4 are both up so that their normally closed first contacts are closed, then the AND circuit 4A1 provides an energizing signal to the first input of the OR circuit 4R. If the cam switch 4CS and the push button switch TB4 are both down so that their second contacts are closed, then the output of the AND circuit 4A2 provides an energizing signal to the second input of the OR circuit 4R. Thus, whenever both switches 4CS, TB4 are in the same position (both up or both down) then one of the AND circuits 4A1, 4A2 provides an energizing pulse to the OR circuit which in turn provides an output energizing signal to the fourth input of the AND circuits 3A1, 3A2 in the next adjacent module.

The arrangement of the AND circuits in the binary 4 module as well as in the binary 2 and binary 1 modules in each command section is substantially the same as the AND circuits in the binary 8 module. The first inputs of the AND circuits 1A1–3A1 and 1A2–3A2 are connected to the supply conductor LX1 for energization only by closure of the command section selection contacts 5CR3, 6CR3, 7CR3. The second and third inputs of the AND circuit 1A1–3A1 are connected to the supply conductor LX1 for energization by closure of the normally closed, first contacts of the cam switches 1CS–3CS and the push button switches TB1–TB3 respectively. The second and third inputs of the AND circuits 1A2–3A2 are connected to the supply conductor LX1 for energization by closure of the normally open, second contacts of the cam switches 1CS–3CS and the push button switches TB1–TB3. The outputs of each pair of AND circuits of each module is connected to an individual OR circuit. The output of the OR circuit for each particular module is connected to the fourth input of the next lower value binary module except for the lowest binary value module, i.e., the binary 1 module. The OR circuit 1R for the binary 1 module is connected to the travel stop coil SCT through an amplifier P.

Because at least one of the energizing inputs of the AND circuits 4A1 and 4A2 are derived from the supply conductor LX1 via the conductor 230 and the command section selection contacts 5CR3, 6CR3, 7CR3 and because at least one of the inputs of the AND circuit 1A1–3A1 and 1A2–3A2 are derived from the output of the OR circuit of a previous module, no energizing signal can be provided by the outputs of the AND circuits of any module unless the positions of the cam switches 1CS–4CS and the push buttons TB1–TB4 are identical for all of the proceeding modules and the particular command section selection contact for that section is closed. Thus, when the positions of all of the cam switches 1CS–4CS are identical to the positions of all of the push buttons TB1–TB4, then the OR circuit 1R provides an energizing signal to the stop coil SCT to stop the travel motion of the stacker 22.

TRAVEL PREVENT CIRCUIT

A travel prevent portion of the travel direction and station selection control circuit 151 prevents energization of either the forward travel control relay FCR or the reverse travel control relay coil RCR and consequently prevents travel of the stacker unless at least one push button has been depressed on the control console 58. The travel prevent portion of the control circuit 151 includes AND circuits 5AF, 5AR and an OR circuit 5R. The OR circuit 5R has an input for each of the push buttons TB1–TB4 in its particular command section. The inputs of the OR circuit 5R are connected to one side of the normally opne second contacts of the push button switches TB1–TB4 and are energized by the power supply conductor LX1 only upon closure of those contacts. The output of the OR circuit is connected to inputs of both AND circuits 5AF, 5AR. An energizing signal will not be provided to either the forward travel control relay FCR or the reverse travel control relay RCR by their respective AND circuits 5AF or 5AR unless the OR circuit 5R is providing an energizing signal at its output. The OR circuit 5R provides an energizing signal at its output only when at least one of the push buttons TB1–TB4 have been depressed to close at least one of their normally open second contacts. Thus, travel of the stackers is prevented unless an address has been registered on the control console by depressing the push buttons TB1–TB4.

INCORRECT ADDRESS CHECKING

In many installations, the total number of cubicle stations will be less than the total number of possible stations which can be selected by the binary control system of the present invention. The travel direction and station selection control circuit 151 in FIG. 17 can provide automatic travel direction and station selection for up to 15 cubical stations with its four binary modules. For purposes of illustration, it is assumed that there are only twelve actual cubical stations along each side of the aisle shown in FIG. 1. To prevent needless travel of the stacker, it is desirable that it be impossible to select cubicle stations 13–15 since there are none.

This is accomplished in command sections I, II by a NOT circuit 1N, and AND circuit CA and an OR circuit 6R. The OR circuit has its inputs connected to the normally open, second contacts of the push button switches TB1–TB2. The AND circuit CA has its first input connected to the output of the OR circuit 6R and its second and third inputs connected to the normally open, second contacts of the push buttons TB3, TB4. Any time the total value of the selection push buttons exceeds the total acual number of cubicle stations (12 in our example) then the AND circuits CA has all of its inputs energized and provides an output to the NOT circuit 1N. The NOT circiut 1N turns its output off so that an energizing signal is no longer provided at its output to the inputs of the AND circuits 5AF, 5AR. With one of their inputs turned off, the AND circuits 5AF, 5AR cannot provide an energizing signal to either the forward control relay FCR or to the reverse control relay RCR. Thus, any travel of the stacker is prevented.

VERTICAL TRAVEL DIRECTION AND ELEVATION SELECTION CONTROL CIRCUIT 152

Referring to FIG. 19, the vertical travel direction and elevation selection control circuit 152 is substantially identical to the horizontal travel direction and station selecion control circuit 151. The vertical travel control circuit 152 includes the three command sections I, II and H with the home command section H permanently wired so that the binary one value switch EB1 is always down with its second contact closed to provide an automatic home selection of elevation 1.

The AND circuits 1AH–4AH and 1AL–4AL of each command section of the vertical travel control circuit 152 correspond to the AND circuits 1AF–4AF and 1AR–4AR in the horizontal travel control circuit 151. The outputs of the vertical travel direction determining AND circuits 1AH–4AH and 1AL–4AL are connected to selectively energize the hoist and lower control relays HCR, LCR via conductors 336H, 336L and the amplifiers P respectively. The control relays HCR, LCR are connected in series with contacts HF1, LF1 across the supply lines 1X1, X2. Elevation location determining AND circuits 1A1–4A1 and 1A2–4A2 in each command section are connected such that when the positions of the elevation cam switches 1ECS–4ECS are identical to the positions of the push button switches HB1–HB4 in a command section the OR circuit 1R of the binary one module provides an energizing signal to the hoist stop coil SCH through its amplifier P. Because the home station cubicles are in the first tier or elevation, the home command section has the switch EB1 in the binary one module down so that its second contact is closed and the switches EB2–EB4 in up positions so that their first contacts are closed.

The vertical travel incorrect address checking circuit in each command section of the control circuit 152 includes a NOT circuit 2N, an AND circuit 2CA and OR circuits 7R, 8R connected so that the selection of a tier elevation greater than four turns the input of the NOT circuit 2N on. The NOT circuit 2N turns off its input so that the AND circuits 5AH, 5AL have their first inputs de-energized and cannot provide an output energizing signal to either the hoist control relay HCR or the lower control relay LCR should either of the conductors 336H or 336L be energized.

The circuitry in the vertical travel control circuit for preventing travel unless at least one push button is selected is identical to that in the horizontal travel control circuit. It comprises in command sections I, II, OR circuits 9R having four inputs connected to the second contacts of the push buttons in their particular command section. The output of the OR circuits 9R are connected to the third inputs of the AND circuits 5AF, 5AR and do not energize these inputs unless at least one push button is depressed in that command section.

PROXIMITY HOMING CONTROL

Figure 20:
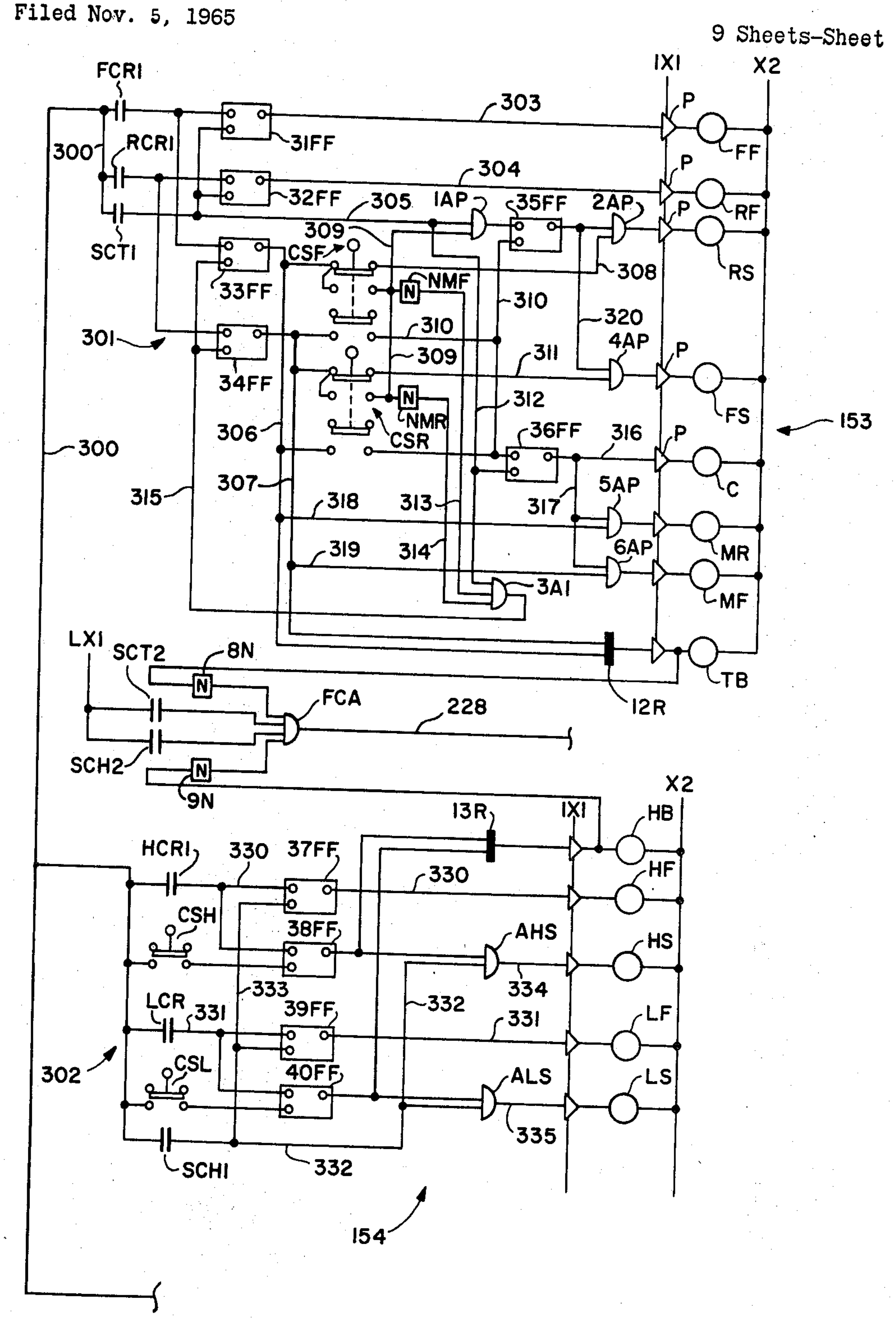

Referring to FIG. 20, the control circuitry for the horizontal travel proximity homing control circuit 153 is supplied by the DC supply conductor 1X1 and the conductor 300. The station proximity homing control circuit 153 includes a forward fast contactor coil FF and a reverse fast contactor coil RF for operating the contacts FF1–FF3 and RF1–RF3 which control energization of the high speed winding of the travel motor 100. The homing control circuit 153 further includes a reverse slow contactor coil RS and a forward slow contactor coil FS which operate the corresponding contacts FS1–FS3 and RS1–RS3 respectively for controlling energization of the low speed winding of the travel motor 100. A micromotor reverse contactor coil MR and a micro-motor forward contactor coil MF are provided in the proximity homing control circuit 153 for operating the contacts MR1–MR3 and MF–MF3 for controlling forward and reverse energization of the micro-motor 106. A clutch contactor coil C and a travel brake contactor coil TB are provided in the control circuit 153 for operating the contacts C1, C2, TB1–TB3 for controlling energization of the clutch 107 and the brake 110, respectively.

The travel proximity control circuit 153 includes a forward travel actuated cam switch CSF and a reverse travel actuated cam switch CSR each having four contacts, the first and third being normally closed and the second and fourth being normally open. As the stacker travels through each station, the actuators *86a*, *87a* for the cam switches CSF, CSR engage the elongated striker plates. The cam switches CSF, CSR operate their contacts when traveling in one direction only. The cam switch CSF is actuated to operate its contacts only when the stacker is traveling in a forward direction. The cam switch CSR is actuated to operate its contacts only when the stacker is traveling in a reverse direction.

A forward travel control conductor 303 is connected from the safety supply conductor 300 to the forward fast contactor coil FF via amplifier P and includes the forward travel control relay contact FCR1 and the input and output terminals of a forward travel initiating flip-flop circuit 31FF. A reverse travel control conductor 304 connects the reverse fast contactor coil RF to the safety supply conductor 300 through the input and output terminals of a reverse travel initiating flip-flop circuit 32FF and a normally open contact RCR1 of the reverse travel control relay RCR. A stopping control conductor 305 is connected to the supply conductor 300 through the normally open contact SCT1 of the travel stop relay SCT. An AND circuit 1AP has its first input connected to the conductor 305 and its output connected to the input terminal of a slow travel initiating flip-flop circuit 35FF. The output of the flip-flop 35FF is connected to the first inputs of AND circuits 2AP, 4AP via conductor 320. The output of the AND circuit 2AP is connected to the reverse slow travel contactor coil RS and causes the coil RS to be energized when both of its inputs are energized. The output of the AND circuit 4AP is connected to the slow, forward travel contactor coil FS and causes the coil FS to be energized when both of its inputs are simultaneously energized.

A flip-flop circuit 33FF is provided for initiating the proximity homing control when the stacker is traveling in a forward direction toward a selected station. The input of the flip-flop circuit 33FF is connected to the forward travel control conductor 303 between the normally open contact FCR1 and the input of the flip-flop 31FF so that both flip-flops 31FF and 33FF are triggered simultaneously to provide energizing signals at their outputs when the contacts FCR1 close. The output of the flip-flop circuit 33FF is connected via a conductor 306 to one side of the normally closed, first contact and the normally open, second contact of the forward travel cam switch CSF, to one side of the normally open fourth contact of the reverse travel limit switch CSR, to the second input of an AND circuit 5AP via a conductor 318, and to a second input of an OR circuit 12R.

A flip-flop circuit 34FF is provided for initiating the proximity homing control during reverse travel movement of the stacker toward a selected station. An input of the flip-flop circuit 34FF is connected to the reverse travel control conductor 304 between the normally open contact RCR1 and the input of the flip-flop 32FF. The inputs of both flip-flops 32FF, 34FF are triggered by an input pulse simultaneously when the contact RCR1 closes to initiate reverse travel. The output of the flip-flop 34FF is connected to one side of a normally open fourth contact of the forward travel cam switch CSF, to one side of a normally closed, first contact and a normally open, second contact of a reverse cam switch CSR, and to the first input of the OR circuit 12R via a conductor 307.

The other side of the normally closed, first contact of the cam switch CSF is connected to the second input of the AND circuit 2AP via a conductor 308. The other side of the second contact of the forward cam switch CSF is connected to the second input of the AND circuit 1AP, to the input of NOT circuits NMF and NMR via conductor 309. The other side of the second contact of the cam switch CSF is connected to the reset terminal of the flip-flop circuit 35FF and to the input triggering terminal of the flip-flop 36FF via a conductor 310. Closure of the normally open fourth contact of the forward cam switch CSF will energize the reset input of the flip-flop 35FF and the triggering input of the flip-flop 36FF only during the return travel toward the selected station after the stacker has overrun said selected station during reverse travel toward the station since the conductor 311 will not be energized unless the reverse travel homing cycle initiating flip-flop 34FF has been triggered by closure of the contact RCR1. The first contact of the cam switch CSR has its other side connected to the second input of the AND circuit 4AP via a conductor 311 and provides an energizing signal to the second input when the flip-flop 34FF has been triggered by closure of the contact RCR1 and the stacker crane is between stations so that the cam switch CSR is not actuated. The other side of the normally open, second contact of the cam switch CSR is connected to the inputs of the NOT circuits NMR, NMF and the second input of the AND circuit 1AP via the conductor 309. The conductor 309 is therefore energized only when the flip-flop 34FF has been triggered to initiate reverse direction proximity homing and the stacker is at or nearly at the selected station so that the cam switch CSR is actuated. The normally open, fourth contact of the cam switch CSR has its other side connected to the trigger input terminal of the flip-flop 36FF and the reset input terminal of flip-flop 35FF. Closure of the fourth contact of the reverse cam switch CSR energizes the inputs of the flip-flops 35FF, 36FF only during the return travel of the stacker from an overtravel position in a forward direction because the conductor 306 connected to the fourth contact of the cam switch CSR is energized only when the flip-flop 35FF has been triggered by closure of the forward control relay contacts FCR1 and the cam switch CSR closes only during travel in a reverse direction.

A conductor 312 connects a first input of an AND circuit 3AP and the reset input of the flip-flop circuit 36FF to the stop control conductor 305 between the stop contact SCT1 and the input of the AND circuit 1AP. Conductors 313, 314 connect the outputs of the NOT circuits NMF and NMR to the second and third inputs of the AND circuit 3AP. The output of the AND circuit 3AP is connected to the reset inputs of the flip-flop circuits 33FF and 34FF to reset these flip-flops via conductor 315 whenever the stop contact SCT1 closes and energizes conductor 305 and the stacker is away from any station such that both cam switches CSF, CSR are in their up, unactuated positions to thereby energize all three inputs of the AND circuit 3AP.

The output of the flip-flop 35FF is connected to the first input of the AND circuit 4AP via a conductor 320. The output of the flip-flop circuit 36FF is connected to the clutch contactor coil C via the conductor 316 and to the first inputs of AND circuits 5AP, 6AP via a conductor 317. The second inputs of the AND circuits 5AP, 6AP are connected to the outputs of the flip-flop circuits 33FF, 34FF respectively via conductors 306, 307 and 318, 319, respectively. The output of the AND circuit 5AP is connected to the reverse micro-motor contactor coil MR. The output of the AND circuit 6AP is connected to the forward micro-motor contactor coil MF. Whenever the flip-flop 36FF is triggered during return movement of the stacker from an overtravel position, the clutch contactor coil C is energized and either the reverse micro-motor contactor coil MR or the forward micro-motor contactor coil MF is energized depending upon whether the forward AND circuit 5AP or the reverse AND circuit 6AP has its second input energized from the forward travel proximity homing initiating flip-flop 33FF or the reverse travel homing proximity initiating flip-flop 34FF, respectively. The output of the OR circuit 12R is connected to the travel brake contactor coil TB and energizes the contactor coil TB to release the travel brake when the OR circuit 12R receives an energizing signal from either of the flip-flops 33FF, 34FF as when travel is initiated in either direction by closure of contact FCR1 or contact RCR1.

The operation of the stacker with its travel proximity homing control is initiated by closure of either the forward travel control relay contacts FCR1 or the reverse travel control relay contacts RCR1 by the travel direction and station selection control circuit 151. If the command is such that the stacker is to travel in a forward direction down the asile from right to left on the drawing of FIG. 1, then the forward control relay contact FCR1 closes to energize the trigger inputs of the flip-flop circuits 31FF, 33FF which consequently provide energizing signals at their outputs. The outputs of the flip-flop 31FF energizes the forward fast contactor coil FF which closes its contacts FF1–FF3 to energize the forward fast windings of the drive motor 100 (FIG. 15) and open its normally closed contacts FF4 and FF5 in the travel direction and station selection control circuit 151 (FIG. 17). The opened contact FF4 de-energizes the forward travel control relay FCR which consequently opens its contacts FCR1. However, since the flip-flops 31FF, 33FF are already in their other stable state, they continue to provide output energizing signals at their outputs until they receive reset signals at their reset input terminals. The open contact FF5 de-energizes the direction seeking control supply conductors 231–234 to open scanning switching circuits so that none of the command sections I, II, H are performing a direction seeking function during travel of the stacker.

The output provided by the flip-flop 33FF energizes one input of the OR circuit 12R which energizes the electric brake contactor coil TB. The energized contactor coil TB closes its contacts TB1–TB3 to energize the electric brake 110 thereby permitting rotation of the motor shaft 105. The stacker accelerates and travels in the forward direction down the aisle toward the selected station. As the stacker travels past each station, the cam switch CSF is closed by the actuator plates to close its normally open, second and fourth contacts and open its first contacts. Each time the second contact closes in switch CSF, it energizes the second input of the AND circuit 1AP and it energizes the inputs of the NOT circuits NMF, NMR which thereupon discontinue providing their energizing output signal to the second and third inputs of the AND circuit 3AP to prevent energization of the reset inputs of the flip-flops 33FF, 34FF should the stop contact SCT1 close at a selected station to energize the first input of the AND circuit 3AP while the stacker is traveling in the forward direction.

As the stacker approaches the selected station, the actuator 86*a* of the cam switch CSF strikes the actuator plate to operate its contacts. The second contact of cam switch CSF closes to provide an energizing signal to the second input of the AND circuit 1AP. As the stacker travels closer to a home position in the selected station, the cam switch CSF remains actuated by reason of the elongated actuator plate and the station indicating cam switches 1CS–4CS are actuated in the binary combination necessary to cause the stop coil SCT to be energized to close its contacts SCT1. The closed contact SCT1 provides an energizing signal to the first input of the AND circuit 1AP which, having both of its inputs energized, provides an output signal to the trigger input of the flip-flop circuit 35FF. The flip-flop circuit 35FF flips to its other stable state and provides an energizing signal on its output to the first input of the AND circuits 2AP. Closure of the stop contact SCT1 provides an energizing signal to the reset input of the flip-flop 31FF which is flipped back to its original stable state and de-energizes the forward fast contactor coil FF to open its contacts FF1–FF3 and de-energize the high speed winding of the drive motor 100. The stacker 22 travels past the selected station because of its inertia until the elongated actuator plate releases the forward cam switch CSF. The first contact of cam switch CSF closes to provide an energizing input to the second input of the AND circuit 2AP.

The AND circuit 2AP having both of its inputs energized provides an output energizing signal to the reverse slow contactor coil RS and energizes the contactor coil RS to close its contacts RS1–RS3 to connect the slow speed winding of the drive motor 100 in a reverse phase relation across the supply conductors 111–113 to energize the low speed windings of the motor 100 for reverse rotation. Since the slow speed windings of the motor 100 are still rotating in a forward direction due to the inertia of the stacker, energization of the slow speed windings in a reverse phase relation effectively plugs the slow speed winding to cause a rapid deceleration of the stacker in the usual plugging technique. The plugging causes the stacker to decelerate to a standstill and then to accelerate in the reverse travel direction. The stacker starts its return travel at the slow speed drive provided by the slow speed winding. As the stacker continues its return movement in the reverse direction, the actuators for the cam switches CSF, CSR engage the actuator plate, but only the contacts of reverse travel cam switch CSR are operated. The actuated cam switch CSR operates its contacts to close its normally open fourth contact and to energize the trigger input of the flip-flop 36FF and the reset input of the flip-flop 35FF. The flip-flop 35FF is flipped back to its original stable state so that no output is provided to the AND circuit 2AP and consequently the reverse slow contactor coil RS is de-energized to open its contacts RS1–RS3 and de-energize the slow speed winding of the drive motor 100. The flip-flop 36FF is triggered to provide an output energizing signal on the conductor 316 to the clutch contactor coil C and on the conductor 317 to the first input of the AND circuit 5AP. The AND circuit 5AP having its first input energized from the output of the flip-flop 36FF and its second input energized from the output of the flip-flop 33FF provides an energizing signal so the reverse micro-motor contactor coil MR. The micro-motor contactor coil MR is energized to close its contacts MR1–MR3 to energize the windings of the micro-motor 106 from the supply conductors 111–113 for rotation in the reverse direction to cause reverse direction travel of the stacker at the micro speed. The stacker continues its reverse direction movement at the micro speed until it reaches a home position at the selected station wherein the station indicating cam switches 1CS–4CS are again actuated by the station indicating actuator cams to cause the stop coil SCT to be energized and close its normally open contact SCT1. This second closure of the stop contact SCT1 energizes the reset input of the flip-flop 36FF via conductors 305, 312. The flip-flop 36FF is flipped back to its original stable state de-energizing the conductors 316, 317 which in turn causes the clutch contactor coil C and the micro reverse contactor coil MR to be de-energized to open their corresponding contacts thereby disengaging the clutch 107 and de-energizing the windings of the micro-motor 106. Since neither of the NOT circuits NMF, NMR have their inputs energized, they provide output energizing signals to the second and third inputs of the AND circuit 3AP which has its first input energized from the conductors 305, 312. The AND circuit 3AP provides a reset signal via the conductor 315 to the reset input of the flip-flop 33FF to flip it back to its original stable state de-energizing its output conductor 306. The OR circuit 12R no longer has an energizing signal at either of its inputs and thereby de-energizes the travel brake contactor coil TB to open its contacts TB1–TB3 thereby de-energizing the electric brake 110 to move to a spring biased position preventing rotation of the drive motor shaft 105.

The operation of the control circuit 153 for proximity homing during reverse travel is accomplished in substantially an identical manner as during forward travel. Reverse travel of the stacker is initiated by closure of the contact RCR1 to trigger the flip-flop 32FF and energize the reverse fast contactor coil RF. The energized contactor coil RF closes its contacts RF1–RF3 to energize the high speed windings of the main drive motor 100 from the supply conductors 111–113 in a reverse phase relation for reverse rotation of the drive motor shaft. Closure of the contact RCR1 also energizes the trigger input of the flip-flop 34FF which provides an energizing output signal on the conductor 307 to energize the travel brake contactor coil through the OR circuit 12R thereby releasing the travel brake. The stacker accelerates and travels at a fast speed in the reverse direction. As it moves past each station, the reverse travel cam switch CSR is actuated by the actuator plate prior to actuation of the station seeking cam switches 1CS–4CS by the station indicating cam actuators. As the stacker approaches the selected station, the cam switch CSR is actuated to close its second contact to connect the second input of the AND circuit 1AP to the energized output of the flip-flop 34FF via conductors 309, 307. When the stacker is exactly at the selected station, the stop contact SCT1 is closed by the stop coil SCT in the station selection control circuit 151. The first input of the AND circuit 1AP is then also energized so that the AND circuit 1AP provides an energizing trigger pulse to the trigger input of the flip-flop 35FF. The output of the flip-flop 35FF energizes the first input of the AND circuit 4AP. Closure of the stop contact SCT1 energizes the reset input of the flip-flop 32FF to de-energize the reverse fast contactor coil RF thereby opening the contacts RF1–RF3 in the energizing supply circuit for the high speed winding of the main drive motor. The stacker's inertia carries it past the selected station until the actuators are clear of the actuator plates. As the stacker travels beyond the selected station, the cam switch CSR is released closing its first contact to energize the second input of the AND circuit 4AP which in turn provides an energizing output signal to the forward slow contactor coil FS. The energized contactor coil FS closes its contacts FS1–FS3 to energize the low speed winding of the main drive motor 100 from the supply conductors 111–112 in a reverse phase relation.

Since the motor 100 is rotating in a reverse direction, energization of its low speed winding for forward rotation effectively plugs the main drive motor causing it to rapidly decelerate the stacker to a standstill and start a return movement in the forward direction at a slow speed. The stacker returns toward the selected station and the actuators again engage the actuator plate. Since the stacker 22 is moving in the forward direction, only the forward cam switch CSF is actuated to close its normally open, third contact thereby energizing the reset input of the flip-flop 35FF and the trigger input of the flip-flop 36FF. The flip-flop 35FF is reset to its original stable state de-energizing the first input of the AND circuit 4AP to in turn de-energize the forward slow contactor coil FS. The de-energized contactor coil FS opens its contacts FS1–FS3 to de-energize the low speed winding of the main drive motor 100. The flip-flop 36FF is triggered to provide an energizing signal at its output to the clutch contactor coil C via conductor 316 and the first input of the AND circuit 6AP. The second input of the AND circuit 6AP is supplied from the output of the flip-flop 34FF via the conductors 307, 319 and the output of the AND circuit 6AP provides an energizing signal to the forward travel micro-motor contactor coil MF. The energized contactor coil MF closes its normally open contacts MF1–MF3 in the energizing supply circuit for the micro-motor to energize the micro-motor for forward rotation and forward travel of the stacker since the clutch has coupled the micro-motor to the main drive motor shaft. The micro-motor causes the stacker to continue to move forwardly toward the selected station at the extremely low micro-speed. When the stacker reaches dead center at the selected station, i.e., a home position, the stop coil SCT in the station selection control circuit 151 is again energized to close the contact SCT1 which energizes the reset input of the flip-flop 36FF via conductors 305, 312 to turn the output of the flip-flop 36FF off thereby de-energizing the clutch contactor coil C and the forward travel micro-motor contactor coil MF thereby releasing the clutch 107 and de-energizing the micro-motor 106. The AND circuit 3AP has all of its input energized and provides a reset signal to the flip-flop 34FF to turn its output off thereby de-energizing the travel brake contactor coil TB through the OR circuit 12R to de-energize the electric brake 110 causing it to lock the drive motor shaft.

ELEVATION PROXIMITY HOMING CONTROL CIRCUIT 154

The elevation proximity homing control circuit 154 is provided for controlling the hoisting and lowering operation of the fork carriage 38. The elevation proximity homing control circuit slows the fork carriage as it approaches the cubicle programmed in the address register on the control console 58 and stops the fork carriage at the exact elevation required to pick up or deliver a load to the selected cubicle.

The elevation proximity homing control circuit 154 includes a fast hoist contactor coil HF and a lower fast contactor coil LF for operating the contacts HF1–HF3 and LF1–LF3 which control energization of the high speed winding of the hoist motor 121. A hoist slow contactor coil LF and a lower slow contactor coil LS are provided in the elevation proximity homing control circuit 154 for operating the contacts HS1–HS3 and LS1–LS3 which control energization of the low speed winding of the hoist motor 121. A hoist motor brake contactor coil HB is provided in the control circuit 154 for operating the contacts HB1–HB3 which control energization of the hoist motor brake 122 and lock the hoist motor 121 in position when both of its windings are de-energized.

The contactor coils HF, HS, LF, LS and HB are connectable across the AC power supply lines LX1, X2 upon energization of their respective amplifiers P. Energization of the hoist fast contactor coil HF is controlled by energization of a control conductor 330 connected to the output of a flip-flop circuit 37FF having its input connected to the supply conductor 300 through a normally open contact HC1 of the hoist control relay HC. Energization of the lower fast contactor coil LF is caused by energization of the conductor 331 which is connected to the output of a flip-flop having its input connected to the supply conductor 300 through normally open contact LC1 of the lower control relay coil LC in the hoist direction control circuit 152. Energization of the hoist slow contactor by energization of conductors 334, 335 which are connected to the outputs of a hoist slow AND circuit AHS and a lower slow AND circuit ALS, respectively. The second inputs of the AND circuits AHS, ALS, are controlled by energization of a conductor 332 from the supply conductor 300 through a normally open, hoist stop contact SCH1 of the hoist stop control relay SCH in the control system 152. The first input of the AND circuit AHS is connected to the output of a flip-flop 38FF having its input connected to the conductor 330 between the hoist control relay contact HCR1 and the input of the flip-flop 37FF. The reset input of the flip-flop 38FF is connectable to the supply conductor 300 through closure of a normally open contact of hoist cam switch CSH. The first input of the AND circuit ALS is connected to the output of the flip-flop 40FF. The flip-flop circuit 40FF has its trigger input connected to the supply conductor 300 through the control relay coil contact LC1 and its reset input connected to the supply conductor 300 through the normally open contacts of the cam switch CSL. Energization of the hoist brake contactor coil HB is controlled by the output of the OR circuit 13R which has one input connected to the output of the flip-flop circuit 38FF and its other input connected to the output of the flip-flop circuit 39FF.

The operation of the elevation proximity homing control circuit 154 is initiated by closure of either the hoist control relay contact HC1 or the lower control relay contact LC1 by the hoist direction control circuit 152 (FIG. 18). The hoist control relay contact HC1 is closed if the fork carriage must be raised to go to the elevation selected on the control console. The normally open lower control relay contact LC1 is closed by the control system 152 if the fork carriage must be lowered to go to the selected elevation. Assuming that the fork carriage is to be raised and that the normally open contact HC1 closes, then the trigger inputs of the flip-flop circuits 37FF and 38FF are energized to turn these flip-flops on providing energizing signals at their outputs. The conductor 330 is energized by the output of the flip-flop circuit 37FF and causes the hoist fast contactor coil HF to be energized and to close its normally open contact HF1–HF3 thereby connecting the high speed winding of the hoist motor 121 to the supply conductors 111–113 for forward rotation of the motor 121. At the same time, the energizing signal appearing at the output of the flip-flop 38FF provides an energizing signal to the first input of the OR circuit 13R which in turn provides an energizing signal to the hoist brake contactor coil HB. The energizing hoist brake contactor coil HB closes its contacts HB1–HB3 to energize the electric hoist brake and release the hoist drive motor shaft. The hoist drive motor 121 commences its rotation raising the fork carriage toward the selected station. As the fork carriage 38 passes each station, the actuators of the hoist cam switches CSH, CSL are actuated by the cams *75c*, *76c* so that the normally open contacts of the cam switches CSH, CSL close at each elevation. As the fork carriage approaches the selected elevation, the elevation indicating cams ECS1–ECS4 are operated to close those of their normally open second contacts which will cause the selected command section to energize the vertical travel stop coil SCH and close its contacts SCH1. The closure of the stop contact SCH1 provides an energizing signal to the reset input of the flip-flop 37FF to de-energize the hoist fast contactor HF. Closure of the contact SCH1 also provides an energizing pulse to the second input of the AND circuits AHS, ALS. The first input of the AND circuit AHS having previously been energized from the output of the flip-flop 38FF, the AND circuit AHS provides an energizing signal to energize the hoist slow contactor coil HS. The hoist slow contactor coil HS closes its normally open contact HS1–HS3 to energize the slow speed winding of the hoist motor 121 for rotation in the forward direction.

The fork carriage 38 then moves slowly further toward a home position. When the fork carriage 38 is at the home position the actuator actuates the hoist cam switch CSH to close its normally open contact and provide an energizing signal to the reset input of the flip-flop 38FF thereby turning the output of that flip-flop off so that no input is provided to the OR circuit 13R or to the AND circuit AHS. The hoist brake contactor coil HB and the hoist slow contactor coil HS are de-energized and permit their normally open contacts to open, de-energizing the low speed winding of the hoist motor 121 and setting the electric brake 122 to hold the fork carriage 38 in position.

Should the normally open contact LC1 be closed by the lower control relay LC in the hoist direction control circuit 152, then the flip-flops 39FF, 40FF are turned on by an energizing signal supplied to their trigger inputs. The output of the flip-flops 39FF provides an energizing signal to an input of the OR circuit 13R which in turn causes the hoist brake contactor coil HB to be energized and close its normally open contacts HB1–HB3 thereby energizing the electric brake 122 to release the hoist motor drive shaft. The output of the flip-flop 39FF also causes energization of the lower fast contactor coil LF which in turn closes its normally open contacts LF1–LF3 to energize the high speed winding of the hoist motor 121 to cause reverse direction rotation of the motor shaft. The fork carriage lowers toward the selected station. As the fork carriage approaches the selected station, the stop contact SCH1 is closed by the hoist stop coil SCH in the hoist elevation selection control circuit 152. Closure of the stop contact SCH1 energizes the reset input of the flip-flop circuit 93FF to de-energize the lower fast contactor coil LF and energizes the second input of the AND circuit ALS. The contactor coil LF opens its contacts LF1–LF3 to deenergize the speed winding of the hoist motor 121. The AND circuit ALS having both of its inputs energize provides an output energizing pulse to the lower slow contactor coil LS. The energized lower slow contactor coil closes its contacts LS1–LS3 to energize the low speed winding of the hoist motor 121 for rotation in a reverse direction. The fork carriage then lowers at the slower speed until it reaches a home position at the selected cubicle such that the cam switch CSL is actuated to close its normally open contact and reset the flip-flop 40FF which then causes de-energization of the lower slow contactor coil LS. The lower slow contactor coil LS permits its contacts LS1–LS3 to open thereby de-energizing the low speed winding of the hoist motor 121. The input to the OR circuit 13R is also turned off and causes the hoist brake contactor coil HB to de-energize thereby opening its contacts HB1–HB3 to set the electric brake and prevent rotation of the hoist motor shaft.

OPERATION

In explaining the operation of the present transfer system, it is assumed that the stacker carrier is initially at the home station 6 and will start the command one function from there. With the control system shown in FIGS. 16–19 and the control console shown in FIG. 8 having two selectable commands and the automatic return home command it is possible for the operator to select any one of the following three functions:

(A) STORE ONLY—wherein the stacker will pick up a load at the home pick up station 6A1, travel to the addressed cubicle and then return to the home station.

(B) RETRIEVE ONLY—wherein the stacker will travel empty to the addressed cubicle, pick up the load stored therein and return home where it will deposit the retrieved load on the home discharge station 6B1.

(C) STORE AND RETRIEVE—which is the sequential combination of functions A and B above.

In the present system shown, when the latter double command function is initiated, the store function will be performed prior to the retrieve function. The control system can be modified to perform the retrieve function before the store function by reversing the fork cycles performed in connection with the commands. As an example, it will be assumed that the stacker will pick up a load at the home pick up station cubicle 6A1 and deliver it to cubicle 13B3 to complete command I. The cubicle 13B3 is the cubicle in the third tier on side B of aisle at station 13. The command II function will cause the stacker crane to travel empty to a second addressed cubicle 7A4 wherein the stacker will pick up a load. The stacker then is caused automatically to travel to the home station 6 and deliver the load to the home discharge station cubicle 6B1 by an automatic home command.

To set up the double command situation, the operator programs the addresses for the destination cubicles 13B3, 7A4 on the two command control console 58. The command information is obtained by the operator from address cards similar to that shown in FIG. 9, or from a list of command functions in their order of performance. A punched tape or other suitable information transfer means can be used to program the command addresses where automatic business machines are used to control closure of the switches TB1–TB4 and HB1–HB4 in the travel and hoist control circuits (FIGS. 18 and 19) rather than the push buttons shown on the console 58.

Cubicle 13B3 has the address B4301–0021 which is shown on card 75. To select or program the address B4301–0021 in the command I section the operator depresses push buttons BI in group 60, push buttons TB4, TB3, the zero push button TB0 under push button TB2 and push button TB1 in the travel push button group 61. He further depresses the zero push buttons TB0 opposite the hoist push buttons HB4 and HB3, and the hoist push buttons HB2 and HB1 in the hoist button selection group 62.

The cubicle 7A4 has the address A–0321–0300. In the command II group, therefore, the operator depresses push button AII in group 60, the zero push buttons opposite travel selection push buttons TB5, TB4 and the push-buttons TB3, TB2, TB1 in the travel selection group 61. He further depresses the zero push button opposite the hoist button HB4, the push button HB3 and the zero push buttons opposite push buttons HB2, HB1 in the hoist selection group 62.

Depressing the aisle selection push buttons B1, AII, closes the same push button switches in the automatic cycle sequencing control circuit 150. Depressing the travel and hoist push buttons TB1–TB4, HB1–HB4 also closes their corresponding switches in the horizontal and vertical control circuits 151, 152. The closed switches are shown in phantom in each of the command sections of the horizontal and vertical travel control circuits 151, 152. Thus, in the command I section of the horizontal travel control circuit 151, the switches TB1, TB3 and TB4 are in the phantom positions shown with their first, normally closed contacts in an open position and their second, normally open contacts in a closed position.

Having programmed the addresses of the command functions, the operator then depresses the dispatch loaded button 69 and then the cycle start button 70. The shuttle forks immediately perform a fork "pick-up" cycle.

Closing the cycle start push button switch 70 provides an energizing signal to the first input of the AND circuit 11A. Closing the dispatch loaded push button switch 69 provides an energizing signal to the trigger input of the flip-flop 22FF which turns the flip-flop output on so that it energizes the conductor 203 and the second input of the AND circuit 11A. The AND circuit 11A provides an output energizing signal on the conductor 204 to the first input of the OR circuit 15R. The output of the OR circuit 15R provides an energizing signal to the time delay OFF circuit 206 via a conductor 208. The time delay OFF circuit 206 immediately provides an energizing signal to the reset inputs of flip-flops 21FF through 24FF to turn their outputs off, and to the solenoid SS of the stepping switch. The energizing signal is maintained momentarily causing the stepping switch solenoid to lift its pawl and position it for stepping the switch bank and then drop the panel to step the switch bank thereby closing contact SS1. The closed contact SS1 provides an energizing signal from the DC power supply conductor LXI to the second inputs of AND circuits 14A, 15A. The first input of the AND circuit 14A is already energized via conductor 211 from the output of the flip-flop circuit 25FF which was turned on when the dispatch loaded switch 69 was closed. The flip-flop 25FF automatically selects side A as the aisle side to which the shuttle forks move to pick up a load at the HOME station cubicle 6A1.

The AND circuit 14A having all of its inputs energized, causes the translational right contactor coil TR to be energized across the AC supply lines 1X1, X2. The energized contactor coil TR closes its contacts TR1–TR3 (FIG. 15) to energize the fork translation motor 125 and cause the shuttle forks to move to the right into aisle A. As the shuttle forks 47, 48 move to the right underneath the load in the HOME station 6A1, the cam 49 on the bottom of the shuttle fork 48 operates an extreme right limit switch LSR to open its normally closed, first contact and close its normally open second contact. The closed second contact of the limit switch LSR provides an energizing signal to the third input of the OR circuit 15F from the power supply conductor LXI via conductors 213, 214. The OR circuit 15R provides a signal to the OFF delay circuit 206 which in turn provides the timed signal via conductor 207 to the stepping switch solenoid SS to cause it to step the switching bank to open contact SS1 and close contact SS2.

The closed contact SS2 provides a signal to the second input of the AND circuit 16A from the supply conductor LX1 via a conductor 215. The first input of the AND circuit 16A is energized from the supply conductor LX1 via the normally closed, first contact of the load detecting switch LD and the conductor 212 as the actuator of the load detecting switch LD is in the up position shown when there is no load on the shuttle forks. The AND circuit 16A produces an output signal to cause the UP contactor coil U of the auxiliary lift unit to be energized across the supply conductors 1X1, X2. The energized contactor coil U closes its contacts U1–U3 (FIG. 15) to energize the auxiliary lift motor 126 thereby causing the auxiliary lift to raise the shuttle forks and lift the load from the platform in the HOME station. As the shuttle forks raise to lift the load from the HOME station platform, the load detecting switch LD is operated to open its first and third contacts and close its second and fourth contacts. When the shuttle forks have raised the load sufficiently to clear the station platform, an extreme up limit switch LSU is actuated to close its normally open contact and supply a signal to the third input of the OR circuit 15R from the supply conductor LX1 via conductors 213, 214. The OR circuit 15R energizes the OFF delay circuit to pulse the stepping switch solenoid SS and cause it to step its switching bank thereby opening contact SS2 and closing contact SS3.

The closed contact SS3 provides an energizing signal to the second input of the AND circuit 18A. The first input of the AND circuit 18A is already supplied from the flip-flop 25FF via the conductor 211. The AND circuit 18A then causes the translational left contactor coil TL to be energized and close its contacts TL1–TL3. The fork translation motor 125 is energized and moves the shuttle forks 47, 48 to the left toward the center of the fork carriage. As the forks approach the center of the fork carriage, the cam 49 operates the fork center limit switch FC to close its normally open, second and fourth contacts and open its normally closed, first and third contacts.

Prior to the time that the fork center switch FC was actuated by the shuttle forks returning to the center position, the closed, first contact of the fork center switch FC turned the outputs of flip-flop 23FF, 24FF on. The output of flip-flop 23FF provided a signal to the first input of AND circuit 12A from the supply conductor LX1. The output of flip-flop 24FF provided a signal to the first input of the AND circuit 13A. Closure of the normally open second contact of the fork center switch FC as the shuttle forks reach a center position energizes the second inputs of the AND circuits 12A, 13A from the supply conductor LX1. The AND circuit 12A then provides a signal to the fourth input of the fork cycle initiating OR circuit 15R via conductor 218. The OR circuit 15R again provides a signal to the OFF delay circuit 206 which provides the momentary pulse to the stepping switch solenoid SS to step the switching bank to open the contacts SS3 and close stepping switch contact SS4. The closed contacts SS4, SS5 cause the stepping switch solenoid SS to continue its stepping operation until it has stepped through its entire bank of switches and is again in a position to close the switch contacts SS1. The AND circuit 13A having both of its inputs energized, turns on the flip-flop 11FF via conductor 220. The energization of conductor 220 signals the end of the fork pick-up cycle and the initiation of operation of the horizontal and vertical travel circuits 151, 152.

The output of the flip-flop 11FF which is now turned on causes control relay coil 5CR to be energized across lines LX1, X2 via conductor 221. The energized coil 5CR closes its contacts 5CR1–5CR6. The now closed contacts 5CR1 in conductor 222 provides a signal to the reset input of the flip-flop 25FF to turn it off thereby de-energizing A aisle side selection conductor 211. The now closed contacts 5CR2 connect the command I aisle side selection push button B1 to the supply conductor LXI to energize the B aisle side selection conductor 223.

The now closed contact 5CR3 and 5CR4 in the command I sections of the horizontal and vertical travel control circuits 151, 152 energize the first inputs of the AND circuits in all of the binary modules in those command sections. The closed contacts 5CR5 and 5CR6 energize the travel and hoist stepping switches TS, HS so that they commence closing their switches TS1–TS4 and HS1–HS4 in sequence.

In the horizontal travel control circuit 151, contact TS1 closes first to energize the fourth input of the AND circuits 4AF, 4AR so that they compare the position of the travel selection push button switch TB4 to the cam switch 4CS. Since the stacker is initially at the some station 6, then cam switches 3CS, 2CS will be down and cam switches 4CS, 1CS will be in their normally up position. In comparing the push buttons switch TB4 to the cam switch 4CS, the comparison circuit provided by the AND circuits 4AF, 4AR determines that the two switches have different positions and that the now closed second contact of the switch TB4 indicates that the address programmed for the command I function (station 13) is higher than the present address of the stacker (home station 6) and that the stacker must travel down the aisle in a forward direction to reach the programmed address.

Since the push button TB4 is actuated and down and the cam switch 4CS is unactuated and up, their closed contacts will cause all four inputs of the forward AND circuit 4AF to be energized. The output of the forward AND circuit 4AF provides an energizing signal via conductor 236F to cause the forward control relay FCR to be energized. The forward control relay closes its contact FCR1 in the travel proximity homing control circuit 153 to energize the trigger input of the flip-flop 31FF. The flip-flop 31FF turns its output on to cause the forward fast contactor coil FF to be energized and close its contacts FF1–FF3 in the motor control system (FIG. 15) to energize the high speed winding of the travel motor 104 for forward fast travel movement of the stacker crane.

As the stacker crane travels in a forward direction down the aisle, the AND circuits 1A1–4A1 and 1A1–4A2 compare the positions of the push buttons TB1–TB4 to the positions of the cam switches 1CS–4CS to determine when the selected address of the command function being performed as programmed on the push buttons TB1–TB4 is identical to the address of the location of the stacker as determined by the positions of the cam switches 1CS–4CS. When the stacker reaches the selected station 13, the positions of the cam switches 1CS–4CS will be identical to the push button switches TB1–TB4 so that travel stop coil SCT is energized to close its contacts SCT1 and SCT2 in the travel proximity homing control circuit 153. As was explained previously, the proximity homing control circuit de-energizes the forward fast contactor coil FF and energizes the reverse slow contactor coil RS to plug the travel motor 100 by energizing its slow speed windings for reverse rotation. The stacker decelerates to a standstill and then commences a return travel at the slow speed. When the carrier reaches a point approximately six inches short of the selected station in its present direction of approach, the station proximity homing control circuit deenergizes the low speed travel circuit and energizes the clutch coil C and the micro-reverse contactor coil MR. The energized clutch coil C closes contacts C1, C2 to energize the clutch. The energized clutch couples the micro-drive motor to the main drive motor. The energized micro-reverse contactor coil MR closes its contacts MR1–MR3 to energize the micro-motor 106 which drives the stacker and causes it to continue its return movement toward the center line of the selected staiton so that the last few inches of travel takes place at micro-speed. Upon reaching the center of the selected station, the station proximity homing control circuit de-energizes the micro-drive motor circuit by de-energizing the contactor coil MR, de-energizes the clutch by de-energizing the clutch coil C and de-energizes the main drive motor brake coils TB which sets the brake on the motor and effectively locks the stacker at the center line of the selected station.

At the time the travel control circuit 151 was determining the direction of horizontal travel, the hoist control circuit 152 was determining the direction of vertical travel required for the shuttle fork carriage to reach the address selected on the push buttons HB1–HB4 by comparing the positions of the push buttons switches HB1–HB4 to the cam switches ECS1–ECS4. In comparing the positions of the two sets of switches HB1–HB4, ECS1–ECS4 from left to right, the switches ECS2, HB2 are the first that differ in position. When contact HS3 is closed by the stepping switch HS, the hoist coil HC is energized to indicate that the fork carriage must be raised to travel to the selected tier 3 from its present position at tier 1. The hoist coil HC closes its contact HC1 in the hoist proximity control circuit 154 which causes the hoist fast contactor coil HF to be energized. The hoist fast contactor coil closes its corresponding contacts HF1–HF3 to cause fast forward rotation of the hoist motor 121 and fast hoisting movement of the fork carriage. As the fork carriage approaches the selected tier elevation and is within approximately six inches of the elevation of the address cubicle, the elevation selection control circuit 152 energizes the coil SCH because the positions of the cam switches ECS1–ECS4 are identical to the positions of the push button switches HB1–HB4. The energized relay coil SCH closes its contact SCH1 in the elevation proximity homing control circuit 154 and its contact SCH2 in the connecting circuit for supply conductor 228 (FIG. 18). Closure of contact SCH1 cause the elevation proximity homing control circuit to de-energize the high speed winding of the hoist motor 121 and to energize its low speed winding so that the last several inches of vertical travel takes place at the low speed. When the exact elevation is reached, the elevation proximity homing control circuit stops the hoisting motion by de-energizing the hoist slow contactor coil HS and sets the electric brake 122 by de-energizing the contactor coil HB. Thus, by the time the stacker reaches the selected station along the aisle, the shuttle fork carriage generally has also reached the selected cubicle elevation.

At this point, the travel and hoist stop contacts SCT2, SCH2 are closed to energize the second and third inputs of the AND circuit FCA and the travel and hoist contactor coils TB, HB are de-energized so that the first and fourth inputs of the AND circuit FCA are energized by the NOT circuits 8N, 9N. The AND circuit FCA provides an energizing signal on the conductor 228 to the automatic cycle sequencing control circuit 150 to energize the second input of the OR circuit 15R and initiates a fork cycle which will be a "let down" fork cycle because there is a load on the shuttle forks as is determined by the load presence determining limit switch LD. The circuit operation and its sequence for the let down fork cycle is identical to the pick up fork cycle except that the down contactor coil D is energized upon closure of the stepping switch contacts SS2 instead of the up contactor coil U. In addition, because the shuttle forks are to deliver the load into the B aisle side, then the translation left contactor coil TL is energized upon closure of the stepping switch contact SS1 and the contactor coil TR is energized upon closure of the stepping switch contact SS3. Thus, the shuttle forks move first to the left to move the load into the cubicle 13B3, then down to set the load on the support, and then back to the right to a centered position actuating the fork center switch FC. The fork center switch closes its fourth contact to advance the automatic cycle sequence control circuit to energize control relay 6CR which closes its contact 6CR1 in the automatic cycle sequence control circuit 150 and its contacts 6CR3–6CR4 in the horizontal and vertical control circuits 151, 152. This ends the first command function, a STORE function, and initiates the second command function, a RETRIEVAL function.

Closure of contact 6CR1 in the cycle sequence control circuit 150 connects one side of the aisle side selection switches AII, BII to supply conductor LXI. The closed switch AII energizes the A aisle side conductor 211.

In the travel direction and station selection control circuit 151, closure of the contact 6CR3 energizes the first inputs of all of the AND circuits in the command II section. Closure of the contact 6CR5 energizes the stepping switch TS to close its contact TS1–TS4 in sequence thereby energizing the fourth inputs of the horizontal travel direction determining AND circuits 1AF–4AF and 1AR–4AR in their reverse order.

Since the stacker 22 is at station 13, the actuated cam switches 1CS–4CS have assumed the phantom positions shown for the actuated push button switches TB1–TB4 in the command I section. Thus, the cam switches 4CS, 3CS and 1CS are down and the cam switch 2CS is up. The AND circuits 4AF, 4AR compare their push button switch TB4 in the command II section to the cam switch 4CS. The position of the push button switch TB4 differs from that of the cam switch 4CS since the cam switch 4CS is down and the push button switch TB4 is up. The binary value of 8 indicated by the actuated cam switch 4CS is higher than any value indicated by the actuated switches in the command II section thereby indicating that the stacker crane must travel in a reverse direction back toward the home station end to go to the station 7. The closed contacts of switches TB4, 4CS energize all four inputs of the AND circuit 4AR and it provides an energizing signal on conductor 236R to cause the reverse control relay RCR to be energized. The reverse control relay RCR closes its contacts RCR1 in the proximity homing control circuit 153 to turn the output of the flip-flop 32FF on thereby energizing the reverse fast contactor coil RF. The contactor coil RF causes energization of the high speed winding of the travel motor 100 for reverse travel along the aisle 21. When the stacker arrives at station 7, the positions of the actuated cam switches 1CS–4CS is that shown in phantom for the actuated push buttons in the command II section whereupon the stop coil SCT is energized and closes its contacts SCT1 in the station proximity homing control circuit. The closed contact SCT1 initiates the proximity homing function to decelerate the stacker crane and spot it at the center line of station 7 with minimum of stress and torque on the system as has been explained.

Closure of the contacts 6CR4 and 6CR6 in the hoist direction and elevation control circuit 152 causes the AND circuits 1AH–4AH and 1AL–4AL in the command II section to compare the positions of the push button switches HB1–HB4 as shown in phantom to that of the cam switches ECS1–ECS4 which have assumed the positions of the push buttons in the comand I section since the fork carriage is at tier elevation 3. The binary 4 value indicated by the push button switch HB3 is larger than the binary value 3 indicated by the cam switches ECS1, ECS2 and therefore the lower movement control relay LCR is energized to close its contact LCR1 in the hoist proximity control circuit 154. The hoist proximity control circuit 154 energizes the hoist fast contactor coil HS to initiate fast hoisting movement of the fork carriage. As the fork carriage arrives at elevation 4 from elevation 3 the cam switches ECS1–ECS4 assume positions identical to those shown for the push buttons HB1–HB4 in the command II section. When this condition is reached, the AND circuits 1A1–4A1 and 1A2, 4A2 provide an energizing signal to cause the stop hoist coil SCH to be energized. The energized hoist stop coil SCH closes its contacts SCH1 in the hoist proximity control circuit 154 to thereby stop the fork carriage when it is at the center line of the elevation 4.

Again, when both the vertical and horizontal travel movements have been completed, the contacts SCT2, SCH2 are closed and the NOT circuits 8N, 9N have their outputs turned on so that the AND circuit FCA provides an energizing signal on conductor 228 to the second input of the OR circuit 15R to initiate another fork cycle, a standard pick-up fork cycle into A aisle side. At the end of the fork pick-up cycle the fork center switch closes its fourth contact which energizes the second input of the AND circuit 4AC. The AND circuit 4AC has its first input energized by the output of flip-flop 14FF which was turned on at the time the shuttle forks moved to their extreme extended position during the latter pick-up cycle. The AND circuit 4AC provides an output to the input of flip-flop 15FF which in turn turns its output on to energize the control relay 7CR. Energization of the control relay 7CR causes it to close its contact 7CR1 in the conductor 228, open its contact 7CR2 at the input of the flip-flop 26FF, close its contact 7CR3 in conductor 260 in the home command section of the horizontal travel direction and station selection control circuit 151, close its contact 7CR4 in the home command section of the vertical travel direction and elevation control circuit 152, close its contact 7CR5 to energize the travel stepping switch TS, and close its contact 7CR6 to energize the hoist stepping switch HS. Because there is a load on the shuttle forks, the third contact of the load presence sensing switch LD is open and its fourth contact is closed. The closed fourth contact of the load presence determining switch LD by-passes the open contact 7CR1 so that another fork cycle initiation signal can be provided by the conductor 228 to the second input of the OR circuit 15R. The open, third contact of switch LD de-energizes the input of NOT circuit 12N so that the output of the NOT circuit 12N energizes the triggering input of the flip-flop 26FF to turn its output on thereby energizing the B aisle side selection conductor 223. The shuttle forks will therefore extend to the left into aisle B upon delivering the load to the discharge home station cubicle 6A1.

The horizontal and vertical travel control circuits 151, 152 again determine the direction in which their respective functions are to take place and then stop the horizontal and vertical travel motions when the stacker crane is at the selection station and at the selected tier elevation. When both the vertical and horizontal travel movements have been completed, the AND circuits FCA again energizes the conductor 228 which energizes the second input of the OR circuit 15R through the closed fourth contact of the load presence determining switch LD and the conductor 245 to initiate the final fork cycle. The shuttle forks run through a let down fork cycle with the shuttle forks extending to the left into B aisle side because the conductor 223 is energized by the flip-flop 26FF. When the shuttle forks have lowered thereby setting the load on the platform in the home discharge station, the load presence determining switch LD returns to its normal position opening its fourth contact to thereby prevent any further energization of the second input of the OR circuit 15R to prevent any further fork cycles. The shuttle forks return to their centered positions.

The energizing signal on conductor 228 was also introduced to the reset input of the flip-flop 15FF thereby turning its output off to de-energize the control relay 7CR, after a delay introduced by the delay element 246 sufficient to permit the shuttle forks to complete a let down fork cycle. At the completion of the fork cycle no further operation occurs and the system is ready for another complete multiple command function programmed on control console 58.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A carrier system comprising:

(a) drive means for moving a carrier in forward and reverse directions of travel along a carrier runway to a selected station along said runway;

(b) a reversible main drive motor operatively connected to said drive means, said main drive motor having high and low speed windings for driving said carrier at high and low speeds when energized respectively;

(c) an auxiliary drive motor operatively connected to said drive means for selectively driving said carrier at a microspeed along said runway, said micro-speed being substantially equal to one-eighteenth of the carrier speed when said carrier is being driven at said high speed by said main drive motor;

(d) station identification means for determining when the carrier is at a selected station;

(e) start circuit means connected to said main drive motor and being actuatable to energize the high speed winding of said main drive motor to cause high speed forward travel of the carrier;

(f) homing control means connected to said drive motors and to said station identification means, said homing control means energizing the low speed winding of said main drive motor for verse carrier travel as the carrier arrives at the selected station during forward travel so that the main drive motor is effectively plugged to decelerate the carrier to a point of standstill beyond said selected station and to cause the carrier to commence a slow speed return travel movement;

(g) said homing control means de-energizing the low speed winding and energizing the auxiliary drive motor as the carrier approaches the selected station during its return travel so as to cause the carrier to complete its return travel to the selected station at said micro-speed; and, (h) said homing control means de-energizing said auxiliary drive motor when said carrier completes its return travel and is at said selected station.

2. The system of claim 1 wherein energization of the high speed winding causes the carrier to travel at substantially 300 feet per minute.

3. The system of claim 1 wherein energization of said high speed winding causes the carrier to travel at substantially 300 feet per minute and energization of said low speed winding causes the carrier to travel at substantially 150 feet per minute.

4. The system of claim 1 wherein a clutch is interposed between said auxiliary drive motor and the carrier means to selectively couple and de-couple said auxiliary drive motor to said drive means; and, said homing control means is connected to said clutch and operates said clutch to maintain said auxiliary motor de-coupled from said carrier drive means except when said auxiliary drive motor is energized to cause return movement of the carrier to a selected station.

5. The system of claim 4 including:

(a) a brake connected to said drive means and to said housing control means, said housing control means causing said brake to prevent further carrier travel when the auxiliary motor is de-energized at the selected station after completing its return travel movement.

6. A load transfer system comprising:

(a) a load carrier including a drive motor, movable adjacent a plurality of load support stations, (b) each station having a unique address indicator;

(c) the load carrier including an address indicator reading device for determining the address of each load support station as the load carrier moves therepast;

(d) an address selector for selecting a load support station to which the load carrier is to travel;

(e) means responsive to numerical correlation between the station address read by said reading device and the selected address on said address selector for initiating deceleration of said load carrier;

(f) an auxiliary drive motor operatively connected to said load carrier and operative to drive said load carrier in a reverse direction to said selected address after stopping of said load carrier at a position beyond said selected address; and (g) wherein the load carrier drive motor includes a high speed winding and a low speed winding, normal travel of said load carrier being in response to actuation of said high speed winding and deceleration of said load carrier being accomplished by de-activating said high speed winding and actuation of said low speed winding in a reverse direction.

7. The load transfer system of claim 6 including means for deactuating said low speed winding upon a reversal in the direction of travel of said load carrier.

8. The load transfer system of claim 7 including means responsive to deactuation of said low speed winding to actuate said auxiliary drive motor.

9. The load transfer system of claim 8 further including brake means responsive to re-establishment of correlation between the station address read by the reading device and the selected address on said address selector for stopping said load carrier.

References Cited

UNITED STATES PATENTS

| | | | |
|---|---|---|---|
| 2,988,237 | 6/1961 | Devol. | |
| 3,076,566 | 2/1963 | Dennis | 214—16.4 |
| 3,139,994 | 7/1964 | Chasar | 214—16.4 |
| 3,246,218 | 4/1966 | Centner et al. | 318—28 XR |
| 3,358,628 | 12/1967 | Kosrow et al. | 318—48 XR |
| 3,402,835 | 9/1968 | Saul | 187—29 XR |
| 3,402,836 | 9/1968 | Debrey et al. | 187—29 XR |
| 3,360,702 | 12/1967 | Lasley et al. | 318—28 |

BENJAMIN DOBECK, Primary Examiner

U.S. Cl. X.R.

214—16.4; 318—162. 467